United States Patent
Schaffner et al.

(10) Patent No.: US 8,750,709 B1
(45) Date of Patent: Jun. 10, 2014

(54) RF RECEIVER FRONT-END ASSEMBLY

(75) Inventors: James H. Schaffner, Chatsworth, CA (US); Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1091 days.

(21) Appl. No.: 12/176,114

(22) Filed: Jul. 18, 2008

(51) Int. Cl.
*H04B 10/80* (2013.01)

(52) U.S. Cl.
USPC .......................................... 398/117; 398/115

(58) Field of Classification Search
USPC .................................................. 398/115–117
See application file for complete search history.

(56) References Cited

U.S. PATENT DOCUMENTS

| | | | |
|---|---|---|---|
| 3,417,400 A | 12/1968 | Black | |
| 3,735,293 A | 5/1973 | Breitenbach | 333/237 |
| 3,781,725 A | 12/1973 | Yoshida | 333/237 |
| 3,909,757 A | 9/1975 | Miyamoto | 333/237 |
| 4,129,841 A | 12/1978 | Hildebrand | |
| 4,152,648 A | 5/1979 | Delogne | |
| 4,339,733 A | 7/1982 | Smith | |
| 4,376,941 A | 3/1983 | Zenel | 343/709 |
| 4,541,120 A | 9/1985 | Szabo | 455/86 |
| 4,987,394 A | 1/1991 | Harman | |
| 5,076,655 A | 12/1991 | Bridges | |
| 5,247,270 A | 9/1993 | Harman | 333/237 |
| 5,291,565 A | 3/1994 | Schaffner et al. | |
| 5,517,199 A | 5/1996 | DiMattei | 342/357.31 |
| 5,703,706 A | 12/1997 | Eckstein | 398/80 |
| 5,936,203 A | 8/1999 | Ryman | |
| 5,936,589 A * | 8/1999 | Kawahata | 343/785 |
| 5,940,196 A | 8/1999 | Piehler | 398/91 |
| 5,963,567 A | 10/1999 | Veselka | 372/21 |
| 6,246,500 B1 | 6/2001 | Ackerman | 398/115 |
| 6,418,248 B1 | 7/2002 | Hayes | 385/24 |
| 6,522,793 B1 | 2/2003 | Szilagyi | 385/2 |
| 6,525,692 B2 | 2/2003 | Kim | 343/702 |
| 6,703,596 B1 | 3/2004 | Moran | |
| 6,724,523 B2 | 4/2004 | Yap | |
| 6,996,345 B1 | 2/2006 | Chen | 398/183 |
| 7,133,576 B2 | 11/2006 | Coldren | 385/1 |
| 7,260,280 B2 | 8/2007 | Ichioka et al. | |

(Continued)

OTHER PUBLICATIONS

Betts, G.E., et al.,"High-Sensitivity Bandpass RF Modulator in LiNb03,"SPIE Integrated Optical Circuit Engineering VI, vol. 993, pp. 110-116 (1988).

(Continued)

*Primary Examiner* — Nathan Curs
(74) *Attorney, Agent, or Firm* — Ladas & Parry

(57) ABSTRACT

A waveguide of radio frequency electromagnetic fields is multi-furcated into a plurality of radio frequency waveguide sections, each radio frequency waveguide section having an optoelectronic modulator electrically coupled to it. Each optoelectronic modulator has an optical waveguide disposed therein such that, in use, light traveling in the optical waveguides of the optoelectronic modulators travels in a direction orthogonal with respect to the direction the radio frequency electromagnetic field travels in the radio frequency waveguide sections. The plurality of radio frequency waveguide sections are fed from a common source of said radio frequency energy. In some embodiments, each radio frequency waveguide section has a dielectric material having a length and/or a dielectric constant selected such that a relative time delay of the radio frequency energy propagating in the radio frequency waveguide sections accommodates for a time delay of the light traveling from one optoelectronic modulator to a next optoelectronic modulator of a series connection of multiple optoelectronic modulators.

39 Claims, 15 Drawing Sheets

(56) References Cited

U.S. PATENT DOCUMENTS

| | | | | |
|---|---|---|---|---|
| 7,369,722 | B2 | 5/2008 | Yilmaz | 385/27 |
| 7,471,258 | B2 | 12/2008 | Hsu | 343/895 |
| 7,486,247 | B2 | 2/2009 | Ridgway | 343/767 |
| 7,558,488 | B2 | 7/2009 | Matsui | 398/201 |
| 7,657,132 | B1 | 2/2010 | Yap | 85/10 |
| 7,660,491 | B2 | 2/2010 | Thaniyavarn | 385/3 |
| 7,738,794 | B2 | 6/2010 | Akiyama | 398/182 |
| 7,835,600 | B1 | 11/2010 | Yap | 385/12 |
| 2002/0105378 | A1 | 8/2002 | Tapio | 330/10 |
| 2004/0067006 | A1 | 4/2004 | Welch | 385/14 |
| 2004/0179825 | A1 | 9/2004 | Im | 386/111 |
| 2006/0270368 | A1* | 11/2006 | Caimi et al. | 455/129 |
| 2008/0069491 | A1* | 3/2008 | Kissa et al. | 385/2 |
| 2009/0051614 | A1* | 2/2009 | Wong et al. | 343/803 |

OTHER PUBLICATIONS

Cho, et al., IEEEE Journal of Quantum Electronics, vol. QE-13, No. 4, pp. 206-208 (Apr. 1977).
Cohn, S.B., et al.,"Optimum Design of Stepped Transmission-line Transformers," IRE Trans. Microwave Theory Tech., vol. 3, No. 3, pp. 16-20 (Apr. 1955).
Cutolo, et al., Applied Physics Letters, vol. 71, No. 2, pp. 199-201 (Jul. 14, 1997).
Emerson and Cumming Microwave Products, Eccostock HiK500F data sheet, www.eccosorb.com, rev. May 11, 2007.
Farwell, et al., IEEE Photonics Technology Letters, vol. 5, No. 7, pp. 779-782 (Jul. 1993).
Ghatak, A.K., et al., "Optical Electronics," pp. 441-447, Cambridge University Press, 1989.
Hsu, R.C., et al., "All-dielectric photonic-assisted radio front-end technology," Nature Photonics, vol., pp. 535-538 (Sep. 2007).
Johnson, et al., IEEE Photonics Techn. Letters, vol. 2, No. 11, pp. 810-811 (Nov. 1990).
Khurgin, et al., Optical Letters, vol. 25, pp. 70-72 (2000).
Kim, et al., Electronics Letters, vol. 41, No. 18 (Sep. 1, 2005).
Lee, R.T., et al., "A design study for the basic TEM horn antenna," IEEE Antennas and Propagation Magazine, vol. 46, No. 1, pp. 86-92 (Feb. 2004).
1c. Maxim, Receiver Sensitivity Equation for Spread Spectrum Systems, MAXIM application note 1140, Jun. 28, 2002 www.maxim-ic.com/an1140.
Morito, K., et al., "A Broad-Band MQW Semiconductor Optical Amplifier with High Saturation Output power and Low Noise Figure," IEEE Photon. Technol. Lett. vol. 17, No. 5, pp. 974-976 (May 2005).
NAVSYNC CW20 GPS receiver specification—www.naysync.com, 2007.
Ruze. J., "Wide-Angle Metal Plate Optics," Proceedings of the I.R.E., vol. 38, No. 1, pp. 53-59 (Jan. 1950).
Shaw, et al., Electronics Letters, vol. 35, No. 18, pp. 1557-1558 ( Sep. 2, 1999).
Shi, W., et al., "Demonstration of Dual-Depletion-Region Electroabsorption modulator at 155 Wavelength for High Speed and Low Driving Voltage Performance," IEEE Photon. Technol. Lett., vol., 17, No. 10, pp. 2068-2070 (Oct. 2005).
Sun, et al., Electronic Letters, vol. 31, No. 11, pp. 902-903 (May 1995).
Taylor, Journal of Lightwave Technology, vol. 17, No. 10, pp. 1875-1883 (Oct. 1999).
Welstand, et al., IEEE Photonics Technology Letters, vol. 7, No. 7, pp. 751-753 (Jul. 1995).
Wood, L., "Opening Statement before the United States Senate committee on the Judiciary, Subcommittee on Terrorism," Mar. 8, 2005.
Bridges and Schaffner, IEEE Transactions on Microwave Theory and Techniques, vol. 43, No. 9, pp. 2184-2197 (Sep. 1995).
U.S. Appl. No. 12/176,089, Yap.
U.S. Appl. No. 12/141,834, Yap.
Adams, R.C., et al., "Comwin Antenna System Fiscal Year 200 Report," SPAWAR, Technical Report 1836, (Sep. 2000).
Cohn, S.B., "Optimum Design of Stepped Transmission Line Transformers," IRE Trans. Microwave Theory Tech., vol. MTT-3, pp. 16-21 (Apr. 1955).
Kumar, G., et al., "Broadband Microstrip Antennas," Table 2, p. 43, Artech House (2003).
Suzuki, T., et al., "Design of a tunnel relay system with a leaky coaxial cable in an 800MHz band land mobile telephone system," Vehicular Technology, IEEE Transactions on, vol. 29, No. 3, pp. 305-316 (Aug 1980).
Thomas, R.W., et al., "Radiax™, a new radiating coaxial cable," Vehicular Technology Conference, 22nd IEEE, vol. 22, pp. 430-439, (Dec. 7-8, 1971).
Wait, J.R., "Electromagnetic Theory of the Loosely Braided Coaxial Cable: Part 1," IEEE Transactions on Microwave Theory and Techniques, vol. MIT-24, No. 9 (Sep. 1976).
LINX Technologies RXM-900-HP-II RF Module specification—<www.linxtechnologies.com> Web. Dec. 30, 2008.
Robert S. Elliott, Electromagnetics, IEEE Press. New York, 1993, equation 5.85, p. 285-291.
U.S. Appl. No. 12/193,500, filed Aug. 18, 2008, Schaffner.
U.S. Appl. No. 12/252,189, filed Oct. 15, 2008, Hsu.

* cited by examiner

Top View

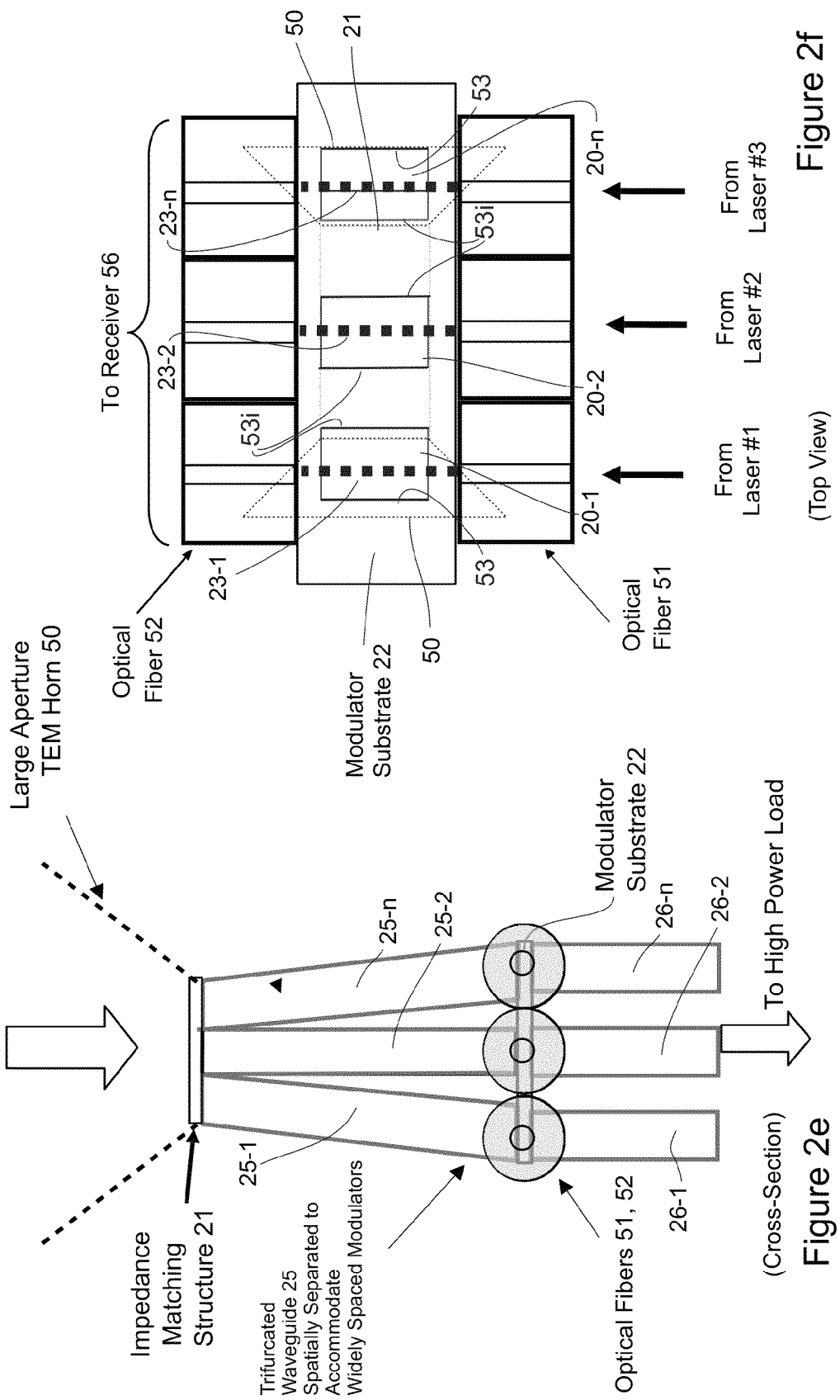

(Cross-Section)

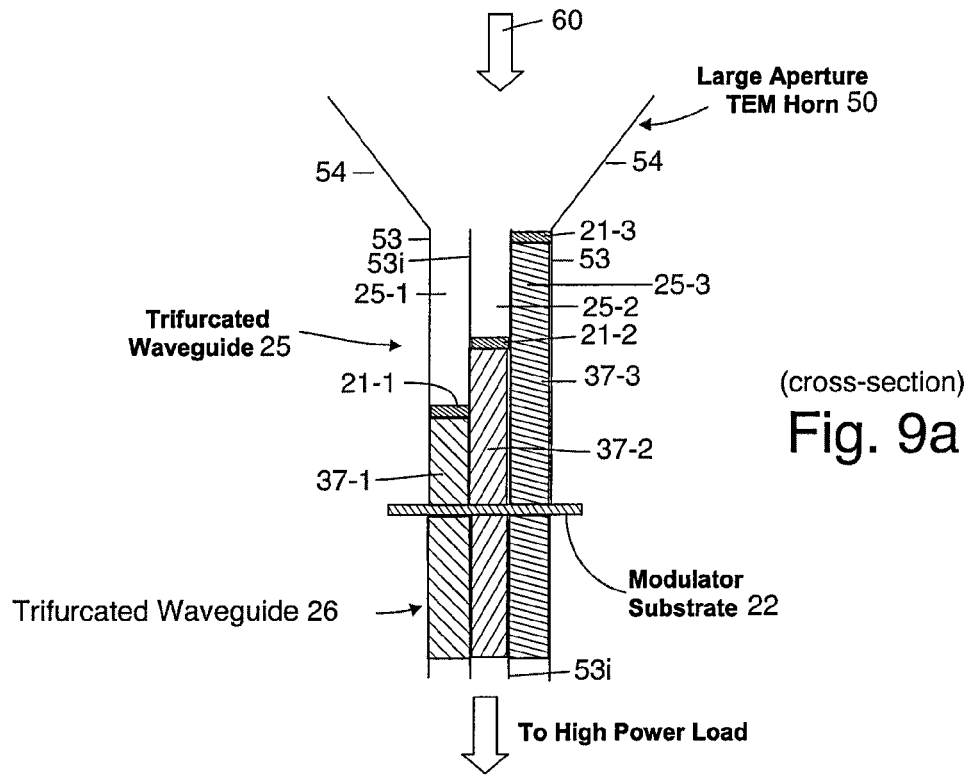
Fig. 9a (cross-section)
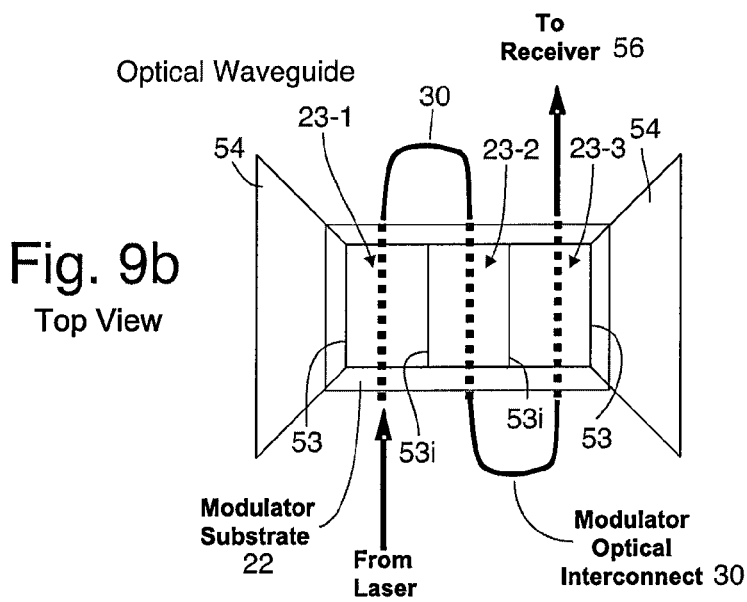
Fig. 9b Top View

Top View

RF RECEIVER FRONT-END ASSEMBLY

CROSS REFERENCE TO RELATED APPLICATIONS

This application is related to the following US patent applications: U.S. Ser. No. 12/141,825, filed on Jun. 18, 2008 and entitled "Optoelectronic modulator and electric-field sensor with multiple optical-waveguide gratings"; U.S. Ser. No. 12/141,834, filed on Jun. 18, 2008 and entitled "Enhanced Linearity RF Photonic Link"; U.S. Ser. No. 12/176,089, filed on the same date as this application and entitled "Parallel Modulator Photonic Link"; and U.S. Ser. No. 12/176,071, filed on the same date as this application and entitled "Microwave receiver front-end assembly and array". The disclosures of each of these related applications are hereby incorporated herein by reference.

TECHNICAL FIELD

This application discloses a receiver front-end assembly that is sensitive to small radio frequency (RF) signal powers incident upon that assembly, yet is also resistant to damage caused by unwanted high power electromagnetic radiation.

BACKGROUND

The adverse effect of high-energy electromagnetic (EM) fields incident on communication radios has been known for a long time. The usual protection against such high field levels has either been fuses, spark gaps or component circuit breakers. Fuses, once activated, need to be replaced before the radio can operate again. Component circuit breakers such as semiconductor diodes or capacitive shunts and spark gaps are limited in the amount of current/voltage that can be shunted and by their reaction time. This disclosure describes a technique to make the front-end of a radio system tolerant of high-energy EM fields while also having high sensitivity to low-energy RF EM signals. One known way to sense incident EM radiation is to use an antenna that is electrically coupled to an electro-optic modulator. The electro-optic modulator is part of an RF-photonic link that also includes a laser light source and a photodetector. The electro-optic modulator modulates the intensity or phase of the light supplied to it from the laser according to the amplitude of the RF signal coupled to that modulator from the antenna. The modulated light from the electro-optic modulator is then supplied to the photodetector which converts that modulated light into an RF electrical output signal. One need of this approach is to achieve strong depth of modulation and good sensitivity to weak RF input signals.

A prior art technique for an electro-optic modulator uses a single optical waveguide formed in electro-optic material and an array of multiple modulator sections that are optically connected in series to increase the depth of modulation, as described by: James H. Schaffner and William B. Bridges, "Broad Band, Low Power Electro-Optic Modulator Apparatus and Method with Segmented Electrodes," U.S. Pat. No. 5,291,565, Mar. 1, 1994. Each of the multiple modulator sections is driven by its own set of electrodes. This prior art disclosure uses printed circuit electrodes and a printed circuit delay structure to feed the input electrical signal to those electrodes such that a phase match is maintained between the RF signal and the optical signal at each electrode. These printed circuit electrodes, because of the high level of their fringing field, cannot withstand a high power RF input. In contrast, the present disclosure uses RF waveguides instead of printed circuit electrodes and printed circuit delay and feeding structure to supply and delay the RF drive signal to the modulators, in order to avoid damage from an incident high power electromagnetic pulse.

Another prior art electro-optic modulator with multiple electrodes that drive an optically series connection of modulator sections is described by: William B. Bridges, "Antenna-Fed Electro-Optic Modulator," U.S. Pat. No. 5,076,655, Dec. 31, 1991. The multiple electrodes are electrically fed by means of the EM field propagating in an RF waveguide, with those multiple electrodes acting as multiple antenna elements that couple the EM field propagating in the RF waveguide. Those multiple electrodes of the modulator are physically separate from the metal walls or enclosure of the RF waveguide and no electrical current flows directly from the metal walls of the RF waveguide to those electrodes. In contrast to this prior art, the present disclosure uses modulators whose electrodes are physical and electrical extensions of the metal walls of the RF waveguide. Electrical current can flow directly from those metal walls to those modulator electrodes. Thus, unlike the prior apparatus of Bridges, the presently disclosed modulators do not have electrodes that are separate from the metal walls of the RF waveguide that feeds the RF signal to those modulators.

An example of arrays of electro-optic modulators whose electrodes also act as antennas is described by: Joseph E. Moran, "Apparatus and System for Imaging Radio Frequency Electromagnetic Signals," U.S. Pat. No. 6,703,596, Mar. 9, 2004. This patent is for an imaging antenna array wherein each antenna element in the antenna array is connected to a separate electro-optic modulator. The apparatus of Moran uses multiple antenna elements and has a single modulator electrically coupled to each antenna element and physically located adjacent to that antenna element. Each antenna element also serves as a drive electrode for a modulator. In contrast, the present disclosure has multiple electro-optic modulators or modulator sections electrically coupled to each antenna element. These modulators or modulator sections can be located at some distance away from the antenna element, being coupled to the antenna element by means of RF waveguides.

The use of multiple parallel plate (TEM) RF waveguides in an array, as a multi-furcation of space, has been known for a long time. However, these prior art have been used for electric-field combining, for example in RF lenses. The difference between these prior art and the use of parallel plate RF waveguides in the present disclosure is that our parallel plate multi-furcation is used to feed RF voltage to an array of optical modulators. These prior art do not include this RF to optical conversion and do not include any optical modulators. The classical paper on the parallel plate lens is: J. Ruze, "Wide-Angle Metal-Plate Optics," *Proceedings of the I.R.E.*, Vol. 38, No. 1, January 1950, pp. 53-59.

The prior art also includes the following documents which are referenced herein:

1a. NAVSYNC CW20 GPS receiver specification—www.navsync.com
1b. LINX Technologies RXM-900-HP-II RF Module specification—www.linxtechnologies.com
1c. MAXIM, "Receiver Sensitivity Equation for Spread Spectrum Systems, MAXIM application note 1140, Jun. 28, 2002, www.maxim-ic.com/an1140.
2. Dr. Lowell Wood, acting chairman for the Commission to Assess the Threat to the U.S. from Electromagnetic Pulse Attack, "Opening Statement before the United States Senate Committee on the Judiciary, Subcommittee on Terrorism, Technology and Homeland Security", Mar. 8, 2005.

3. R. T. Lee and G. S. Smith, "A Design Study for the Basic TEM Horn Antenna," IEEE Antennas and Propagation Magazine, Vol. 46, No. 1, February 2004, pp. 86-92.
4. A. K. Ghatak and K. Thyangarajan, Optical Electronics, Cambridge University Press, Cambridge, 1989, pp. 441-447.
5. Emerson and Cuming Microwave Products, Eccostock® HiK500F data sheet, www.eccorsorb.com, rev. May 11, 2007.
6. G. E. Betts, L. M. Johnson, and C. H. Cox, "High-Sensitivity Bandpass RF Modulator in LiNbO3," SPIE Integrated Optical Circuit Engineering VI, Vol. 993, 1988, pp. 110-116.
7. J. W. Shi, C. A. Shiao, Y. S. Wu, F. H. Huang, S. H. Chen, Y. T. Tsai, and J. I. Chyi, "Demonstration of a Dual-Depletion-Region Electroabsorption modulator at 1.55-µm Wavelength for High-Speed and Low-Driving-Voltage Performance," IEEE Photon. Technol. Lett., Vol. 17, No. 10, October 2005, pp. 2068-2070.
8. S. B. Cohn, "Optimum Design of Stepped Transmission-Line Transformers," IRE Trans. Microwave Theory Tech., Vol. 3, No. 3, April 1955, pp. 16-20.
9. K. Morito, S. Tanaka, S. Tomabechi, and A. Kurmata, "A Broad-Band MQW Semiconductor Optical Amplifier with High Saturation Output Power and Low Noise Figure," IEEE Photon. Technol. Lett., Vol. 17, No. 5, May 2005, pp. 974-976.

Many of today's sophisticated communication radio receivers are extremely sensitive and need to demodulate signals that are well below −100 dBm, that is, less than 100 fW (see documents 1a-1c mentioned above). While this low signal threshold increases the range between the transmitter and the receiver, it also makes these receivers highly susceptible to destruction by high power incident radiation. These high power incident radiation can be caused on purpose (see document 2 mentioned above), or could even be accidental (e.g. from crossing the path of a high power microwave beam). The invention described in this disclosure addresses the need to maintain high radio sensitivity, while at the same time insuring tolerance to transient high power electromagnetic radiation.

In order to understand the ability of the disclosed receiver front-end assembly's capability to withstand high power microwave or RF radiation while maintaining high sensitivity, consider the single element 10 shown in FIG. 1. This element is described in greater detail in the related U.S. Ser. No. 12/176,071, filed on the same date as this application and entitled "Microwave receiver front-end assembly and array" mentioned above, but is summarized here as background material for a better understanding of the present invention. A transverse electromagnetic (TEM) horn antenna 50 channels the RF signal into a TEM waveguide 25 in which one or more electro-optic modulators 20 are located. Although the horn antenna 50 needs not be TEM, it is important that the waveguide 25 be TEM in order to establish as uniform a transverse electric field as possible across an electro-optic modulator 20 embedded in the waveguide 25. An optical signal from a laser (not shown) interacts with the RF signal inside the width of the TEM waveguide 25 (see document 4 noted above) resulting in modulation of the phase or intensity of that optical signal. Other antennas besides horn antennas could be used as long as they have appropriate transitions to the TEM waveguide 25. The waveguide 25 is preferably filled with a dielectric material whose relative permittivity (or dielectric constant) has a value that is close to the permittivity of the material from which the electro-optic modulator 20 is fabricated. For example, if the modulator 20 is fabricated from lithium niobate (LiNbO3), the required dielectric constant should be approximately thirty. This can be achieved using ceramic based material such as Emerson and Cumings Eccostock (see document 5 noted above). The reason for this constraint is so that there is little reflection at the interface between the RF waveguide and the electro-optic modulator(s). The TEM waveguide 25 may be terminated in a high power load or another TEM waveguide 26 or TEM horn 70, or may even not be terminated.

The electro-optic modulators 20 have integrated optic waveguides, but have no printed circuit electrodes, which makes them quite a bit different than other prior art integrated optic modulators, such as those described in document 6 noted above. This avoidance of printed circuit electrodes is to prevent the electric field across an individual integrated optic waveguide from becoming too high during exposure to a high power electromagnetic pulse, which could produce a fringing electric field so high as to cause the dielectric material nearby the integrated optic waveguide to breakdown. With the assembly of FIG. 1, the electric field is maintained between the two pieces of metal that make up the top and bottom conductors 53 of the TEM waveguide. Because the depth of modulation of the optical signal in the electro-optic modulator is directly proportional to the electric field strength, the modulation is weakened by the need to keep the top and bottom conductors of the TEM waveguide far apart. Sufficient distance must be kept between those top and bottom conductors to avoid breakdown of the dielectric fill material and of the electro-optic material when that assembly is exposed to the high power electromagnetic pulse. Note that the fringing fields produced in a TEM waveguide can be significantly lower than the fringing fields produced at a printed circuit electrode.

In order to improve the sensitivity of the front-end assembly to weak input electromagnetic signals one can use some combination of multiple electro-optic modulators. One way to combine multiple modulators is to cascade those modulators, as described in related U.S. patent application Ser. No. 12/141,825, filed on Jun. 18, 2008 and entitled "Optoelectronic modulator and electric-field sensor with multiple optical-waveguide gratings". Another way to combine multiple modulators is to arrange them optically in parallel but feed them from the antenna electrically in series, as described in related U.S. patent application Ser. No. 12/176,089, filed on the same date as this application and entitled "Parallel Modulator Photonic Link". The optical outputs from these multiple parallel-arranged modulators are combined to produce a stronger output signal. The approaches described in these two related patent applications make use of multiple modulators that are formed within and electrically coupled to the same TEM RF waveguide. In contrast, the multiple modulators disclosed herein are electrically coupled to different RF waveguide portions of the multi-furcation. Those multiple modulators also may be formed exterior to the RF waveguide portions and attached to the ends of those RF waveguide portions. Preferably, those multiple modulators are formed on the same electro-optic modulator substrate.

BRIEF DESCRIPTION OF THE INVENTION

The disclosed assembly uses a linear array of optoelectronic modulators that are electrically coupled to a linear array of RF waveguides, an example of which is a dielectric filled TEM waveguide. The optical signals in the modulators travel in a direction orthogonal to the direction an RF signal travels in the RF waveguide. Each RF waveguide is part of a multi-furcation of a larger RF waveguide that is fed by a single antenna, such as a TEM horn, a dielectric rod or a dish. For a TEM RF waveguide, the top and bottom walls of the TEM waveguide are electrically coupled to the electrodes for the modulators. In one embodiment, modulators in the array can be optically connected in series, or be cascaded, so that the optical signal travels in sequence from one modulator to the next in the array. The depth of modulation can then be enhanced by using different electrical lengths for the RF waveguides feeding the RF signals to different ones of the modulators in the array, in order to keep the RF signal driving the modulation of those modulators phase matched to the modulated optical signal that propagates from one modulator to the next. A single output optical fiber then connects the assembly with the photodetector of the RF-photonic link. In an alternative embodiment, the modulators in the array can be optically connected in parallel such that each modulator receives an unmodulated optical signal from its laser source and each optical signal is modulated the same way by the RF signals supplied in parallel by means of the multi-furcation. These optical signals may come from one or more lasers, and may be at the same or different wavelengths (the general use of parallel optical modulators is described in related U.S. patent application Ser. No. 12/176,089, filed on the same date as this application and entitled "Parallel Modulator Photonic Link". The overall optical link gain is increased because the modulated optical signals from the parallel modulators are detected by one or more photodetectors and summed.

The novel features of this invention include:

A TEM waveguiding structure that is multi-furcated into an array of reduced height TEM waveguides and an array of electro-optic modulators whereby each electro-optic modulator is electrically coupled to a reduced height TEM waveguide.

A multi-furcated TEM waveguiding structure where each reduced height TEM waveguide is dielectrically loaded such that the time delay of the signal within each reduced height TEM waveguide can be controlled. This control can be achieved using different lengths of dielectric in different TEM waveguides or by using different materials in different TEM waveguides, with those different materials having different values for their relative permittivity or dielectric constant.

An embodiment wherein each modulator is connected optically in series to provide enhanced modulation sensitivity and a single optical output is connected to the radio receiver. This embodiment includes a method of establishing the delay or electrical length of each reduced height TEM waveguide so that the RF signal and the modulation of the optical signal remain phase matched throughout the assembly.

An embodiment wherein each modulator is connected optically in parallel with optical inputs provided from one or more laser sources. The parallel optical outputs lead to one or more photodetectors at the receiver, where the detected RF carriers are electronically summed to provide an enhanced signal magnitude.

Each reduced height RF waveguide of the multi-furcation includes an impedance matching structure. A separate matching structure may be located within each reduced height waveguide of the multi-furcation, or a single matching structure may be located before the multi-furcation and cover the entrance to all of the reduced height waveguides.

Use of optical amplifiers between cascaded modulator sections to maintain a high optical modulation response at each modulator section.

BRIEF DESCRIPTION OF THE DRAWINGS

FIGS. 2e and 2f respectively show side-elevation and top views of another embodiment of the invention having multiple optically parallel-connected modulators, wherein each modulator is electrically coupled to a separate reduced height RF waveguide of the multi-furcation. The physical spacing between the reduced height RF waveguides increases gradually from the point of the multi-furcation to their intersection with the modulator substrate containing the multiple modulators.

FIGS. 9a and 9b are respective side elevation and top view of an embodiment of the invention comprising a single modulator substrate containing an optically series-connected array of optoelectronic modulators that are electrically coupled to a multi-furcated (trifurcated in the figure) TEM waveguide wherein each waveguide furcation has an appropriate electrical length to time match to the optical signal modulated by the RF signal supplied through that branch.

DETAILED DESCRIPTION

Figure 2A:
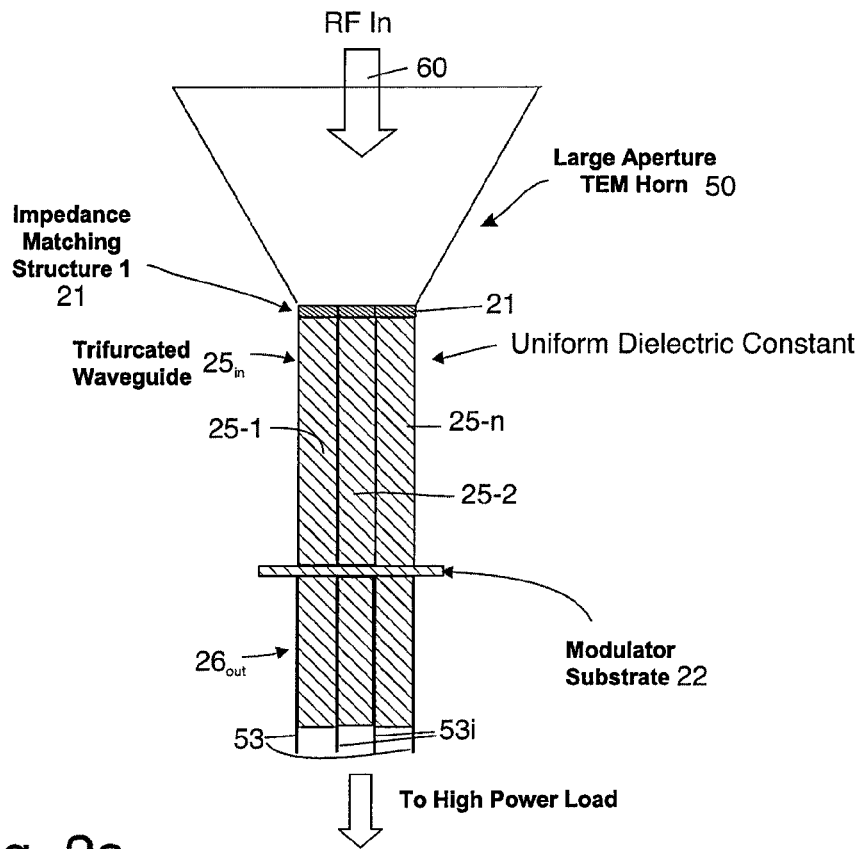
FIGS. 2a and 2b respectively depict side-elevation and top views of an embodiment of the invention having optically parallel-connected modulator sections. A single modulator substrate containing the multiple parallel-connected optical modulators is shown, wherein each modulator is electrically coupled to a separate reduced height RF waveguide of the multi-furcation. The metal walls of the multi-furcation also serve as electrodes for each modulator. Each modulator has a separate optical input and output and the parallel modulated optical carriers are detected at the receiver.
Figure 2B:
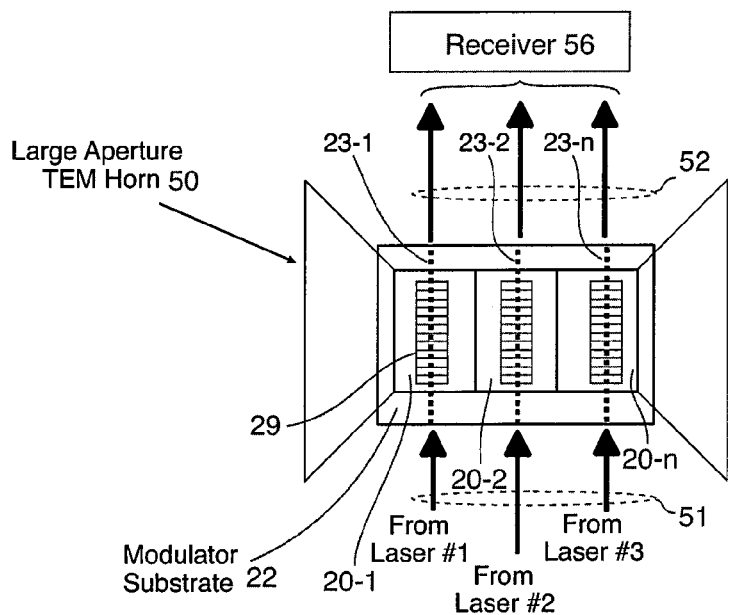

A first embodiment of this invention wherein multiple optoelectronic modulators are coupled to a single antenna or antenna element is shown in FIGS. 2a and 2b. In these figures, a horn antenna 50 feeds an incident RF electromagnetic signal 60 into a transverse electromagnetic (TEM) multi-furcated RF waveguide $25_{in}$ (the depicted waveguide is trifurcated, but may have as large a number of furcations or branches as desired). The multiple TEM waveguide sections, i.e., the reduced height TEM waveguides 25-1 through 25-n of the multi-furcated waveguide 25 guide the RF EM field to a modulator substrate 22 that has an array of modulators, or modulator sections, 20-1 through 20-n that are physically oriented parallel to each other. Each modulator 20-1 ... 20-n contains an optical waveguide 23-1 ... 23-n. Each modulator also could include an optional grating 29. Each modulator 20-1 ... 20-n is electrically coupled to an associated reduced-height RF waveguide 25-1 ... 25-n. Each reduced height RF waveguide 25-1 ... 25-n supplies the RF signal for modulating the light in its associated optoelectronic modulator 20-1 ... 20-n. In general, a wide range of optoelectronic modulator types can be used, both electro-optic (see document 6 identified above) and electro-absorptive (see document 7 identified above), as long as the top and bottom metal sides 53, 53i of each reduced height waveguide 25-1 ... 25-n acts as an electrode for the associated modulator element 20-1 ... 20-n.

In this embodiment, the optical connections or fibers 51, 52 to the optical waveguides 23-1 through 23-n of the modulator sections 20-1 through 20-n are made in parallel, with unmodulated light being coupled into each optical waveguide 23-1 through 23-n and modulated light being coupled from each optical waveguide 23-1 through 23-n to one or more photodetectors at a receiver 56. The unmodulated optical inputs into each modulator section 20-1 through 20-n can be supplied by optical connections or fibers 51 from a single laser by using an optical splitter, known in the art, to split the optical signal into parallel parts, or the unmodulated optical inputs can alternatively be supplied from multiple lasers. The optical signal in each modulator section 20-1, ..., 20-n is modulated by the RF electric field present in each reduced height waveguide 25-1, ..., 25-n of the multi-furcated input waveguide 25in, at the junction of the reduced height waveguide with the modulator substrate 22. An optional output RF waveguide 26out can similarly be multi-furcated. The modulated optical signal out of each modulator section is transmitted by optical fibers 52 or by free space optics to a receiver 56 that contains one or more photodetectors that convert the modulated light into an output RF signal. If the optical carrier from each modulator section is at the same optical wavelength, then an array of photodetectors is used, with a separate photodetector for each of the multiple modulators 20-1 through 20-n. The RF signals output from the multiple photodetectors can then be summed by using known RF power combining techniques to enhance the overall modulated signal. If the optical carrier from each modulator is at a different optical wavelength or if each optical carrier is produced by a different laser, then a single photodetector can be used if a known optical power combiner is used before the receiver. The receiver processing of the parallel optical channels is preferably identical to that described in U.S. patent application Ser. No. 12/176,089, entitled "Parallel Modulator Photonic Link", although in that application, the RF signal is not split into parallel reduced height waveguides. If the RF signal is expected to come from a direction normal to the horn aperture, or if that horn aperture and RF waveguide can support only the lowest-order waveguided mode, then the dielectric materials that fill the reduced height waveguides of the multi-furcation preferably have the same relative permittivity so that no difference in time delay is produced for the various RF signals arriving at the multiple modulators. All of the modulators thus are driven by the same temporal portion of the RF input signal 60 supplied to the antenna 50.

Figure 1:
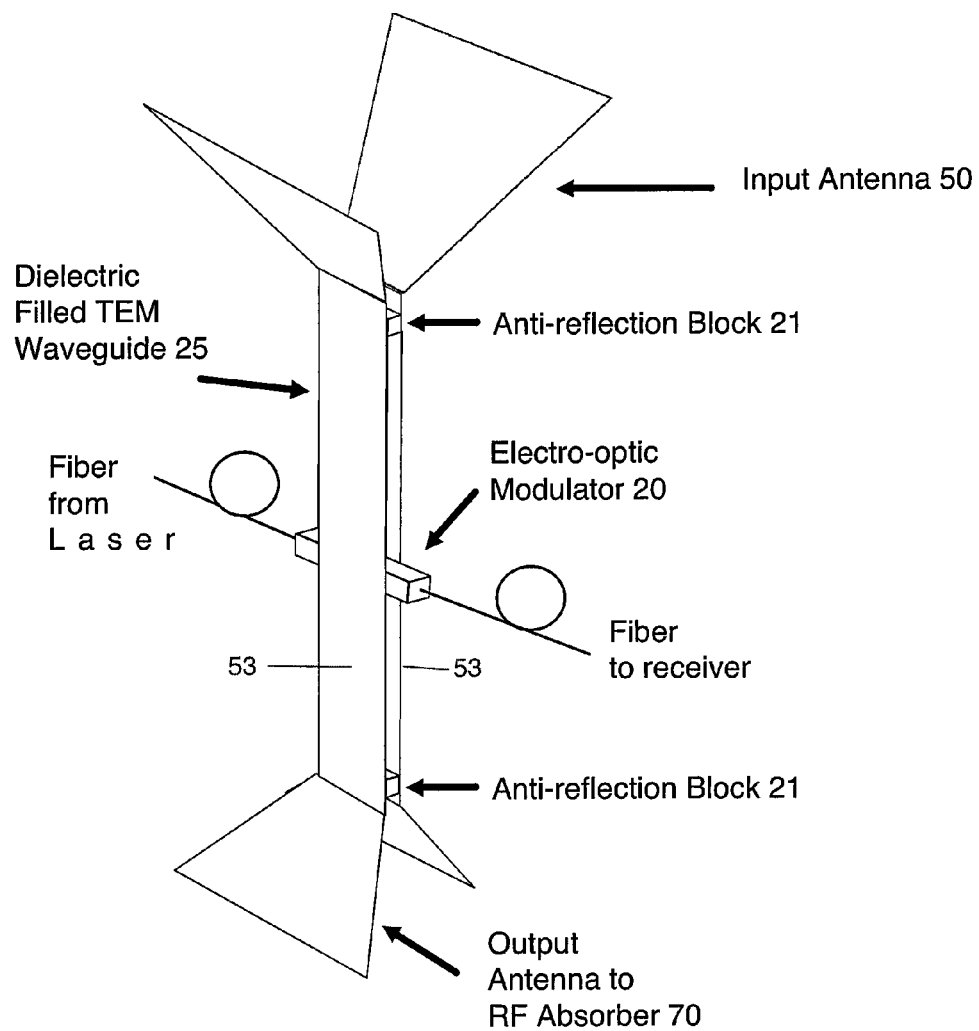
FIG. 1 depicts a single element of the microwave receiver front-end assembly of the type disclosed in related U.S. Ser. No. 12/176,071, filed on the same date as this application and entitled "Microwave receiver front-end assembly and array".

This invention has utility in enabling one to sense the EM field energy incident upon a larger cross-sectional area of the front of the TEM waveguide. This need to sense a larger cross-sectional area may arise when the minimum allowable separation distance between the metal walls of the TEM horn 50 is limited by the need to keep the maximum level for the RF electric field at the entrance to the TEM waveguide 25, for some specified high-power incident EM radiation, sufficiently low that the materials comprising the front end assembly will not exceed their dielectric breakdown strength. For example, assume that the horn antenna 50, which could be one element of a phased array of horn antennas, feeds a single TEM waveguide 25 as depicted in FIG. 1. The lateral size of a typical optoelectronic modulator (suitable for light of 1550 nm wavelength) is on the order of 10 micrometers and multiple optoelectronic modulators typically can be placed side by side with a spacing of approximately 20-30 micrometers between their optical waveguides while remaining optically isolated from each other. If the front end must withstand very high power incident EM radiation, the minimum separation distance between the exterior metal walls 53 of the TEM waveguide 25 may need to be 100-200 micrometers or larger. Thus, much of the energy of an incident EM field would not be sensed if the TEM waveguide were coupled to only a single optoelectronic modulator.

In an optical or RF-photonic link with a single optoelectronic modulator that is driven by the RF signal supplied through a single TEM waveguide, the overall gain of the link, $G_1$, is related to the voltage $V_1$ of the RF signal and the thickness or height $d_1$ of the TEM waveguide by $$G_1 = K \frac{V_1}{d_1}$$

wherein K is a collection of constants that depend upon the other modulator and link properties [see document 11 cited above] such as the optical power into the modulator. In essence, the gain of the link is directly proportional to the magnitude of the electric field driving the optoelectronic modulator. For the case of the N-furcated TEM waveguide assembly with an array of N optoelectronic modulators, if the optical power supplied into each modulator of the array is the same as the optical power supplied into the original single modulator, then each of those N parallel modulators of the array contributes a gain $G_1'$ described by the formula below (where $V_1'$ is the RF signal voltage applied to the reduced height waveguide associated with that optoelectronic modulator and $d_1'$ is the thickness or height of the reduced height waveguide)

$$G_1' = K \frac{V_1'}{d_1'} = K \frac{V_1 N}{d_1 N} = G_1.$$

Therefore, if each of the modulated optical signals, or photodetected RF signals, is summed at the receiver, the total gain of the optical link is enhanced by a factor of N.

We provide an example of how to determine the minimum allowable separation between the two exterior parallel metal walls of a TEM waveguide, or to the height $d_1$ of a TEM waveguide, as well as to the height $d_1'$ of a reduced height waveguide of a multi-furcation. Assume that a high power RF signal with a power density of $P_0$ is incident at the entrance aperture of the TEM horn. If the entrance aperture of the horn were approximated as an open TEM waveguide, then the root-mean square voltage developed across that aperture would be $$V_0 = \sqrt{P_0 Z_0}$$

where $Z_0$ is the impedance of the TEM waveguide given by $$Z_0 = \eta d_0/w$$

and for which $\eta$ is the free space wave impedance, 376.7$\Omega$, $d_0$ is the distance between the metal top and bottom walls of the waveguide aperture and w is the width of the TEM assembly. Assume that this open TEM waveguiding horn transitions down to a separation of $d_1$ between its metal walls (or electrodes) without RF loss over a desired frequency band. Over these frequencies, very little power is reflected back out through the horn, so if we make the approximation that no power is lost, the ratio of the voltage at a point along the open TEM waveguiding horn to the voltage at the entrance aperture of the horn is $$\frac{V_1}{V_0} = \sqrt{\frac{Z_0}{Z_1}} = \sqrt{\frac{d_0}{d_1}}.$$

Thus the voltage, $V_1$, applied to the TEM waveguide coupled to the exit of the horn has been stepped up by the impedance transformation. If the height of the TEM waveguide is kept constant, and assuming negligible loss in the TEM waveguide, this voltage value also is applied across the optoelectronic modulator that is electrically coupled to that TEM waveguide. Now if the maximum allowable voltage is set to be the dielectric breakdown voltage, $V_{BD}$, of some material, then the smallest value $d_1$ can have is $$d_1 = \frac{V_0^2}{V_{BD}^2} d_0.$$

Now suppose the TEM waveguide coupled to the exit of the horn then transitions into N-furcated reduced height waveguides, with each reduced height TEM waveguide having a distance $d_1'$ between its top and bottom metal walls. Again we assume that there are no reflections over the desired operational band so that we can write $$P_0' = \frac{P_0}{N} = \frac{V_0^2}{NZ_0} = \frac{V_1'^2}{Z_1'}$$

where $V_1'$ is the voltage across one reduced height waveguide of the N-furcation at its junction with the modulator. The impedance at the junction with the modulator is given by $$Z_1' = \eta \frac{d_1'}{w}$$

where w is the TEM waveguide width, which is assumed to be kept constant throughout the assembly. Thus, $$V_1'^2 = V_0^2 \frac{d_1'}{Nd_0}.$$

Also, $$V_1' = \frac{V_1}{N},$$

so $$\frac{V_1^2}{N^2} = V_0^2 \frac{d_1'}{Nd_0},$$

which means that when $V_1 = V_{BD}$ we get an expression for the minimum spacing $d_1'$ between the metal walls of the reduced height TEM waveguide:

$$d_1' = \frac{V_{BD}^2}{NV_0^2}d_0 = \frac{d_1}{N}.$$

Thus, $d_1'$ is smaller than $d_1$ by exactly the number of reduced height waveguides that make up the multi-furcation.

Figures 2C, 2D:
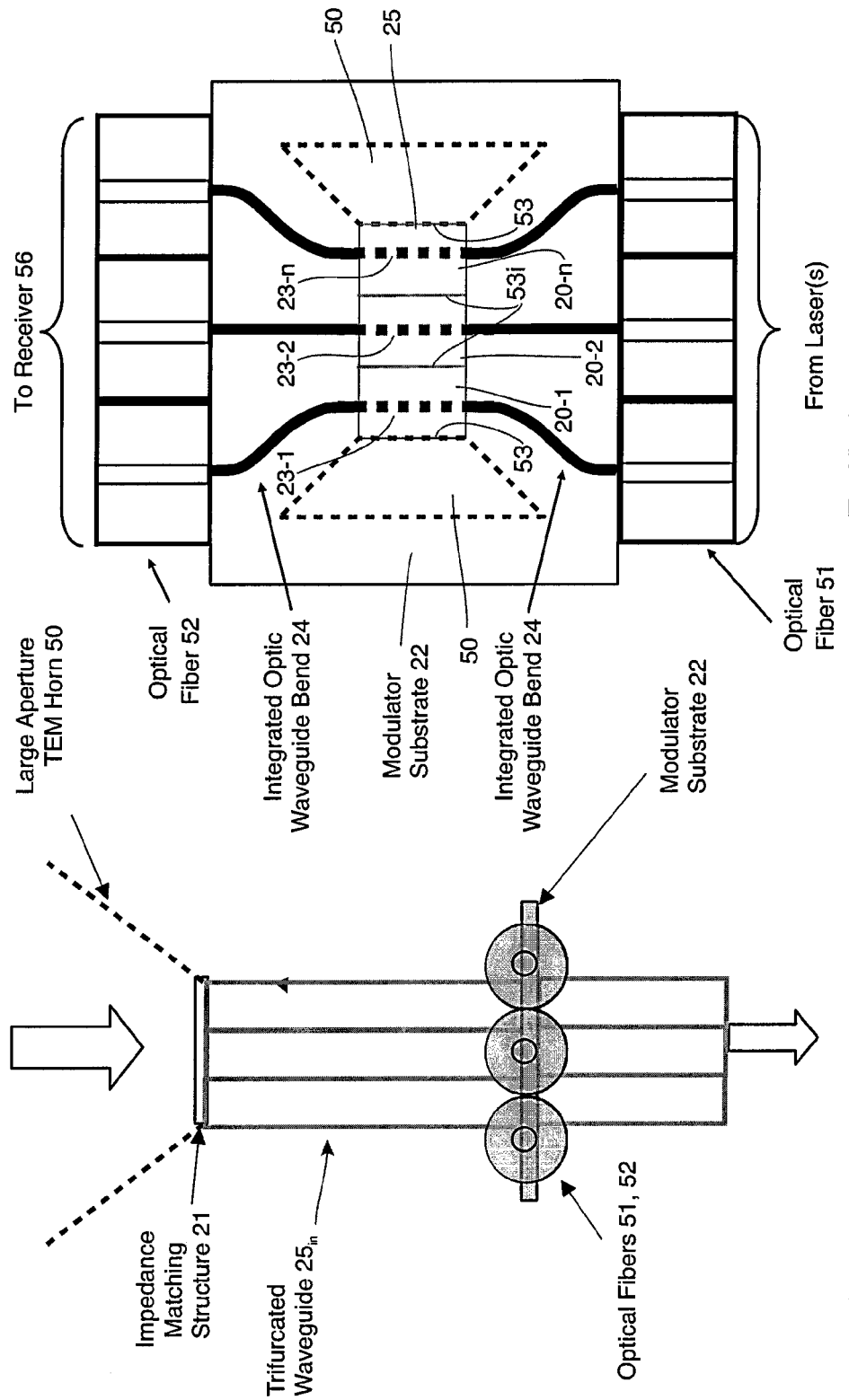
FIGS. 2c and 2d respectively show side-elevation and top views of another embodiment of the invention having optically parallel-connected modulator sections. A single modulator substrate containing the multiple parallel-connected optical modulators is shown, wherein each modulator is electrically coupled to a separate reduced height RF waveguide of the multi-furcation. The multiple modulators are optically connected to a set of integrated optic waveguides at each of the two ends of the modulators.

FIGS. 2c and 2d illustrate another embodiment of the modulator substrate 22. Each of the reduced height TEM waveguides 25-1 through 25-n of the multi-furcated input waveguide $25_{in}$ is electrically coupled to a different one of the optoelectronic modulators, or modulator sections, 20-1 through 20-n. Those modulators 20-1 through 20-n are preferably all located on the same modulator substrate 22. Although the minimum center-to-center spacing between those parallel arranged modulators can be as small as 20-30 micrometers, or even smaller, those multiple modulators may need to be optically connected to an array of optical fibers that supply the unmodulated light from the lasers and that carry the modulated light to the photodetectors of the link. A typical optical fiber for 1550 nm wavelength light has a diameter of approximately 125 or 250 micrometers. Thus, in order to accommodate the large center-to-center spacing between the arrays of optical fibers 51, 52 that connect to the multiple modulators 20-1 . . . 20-n, the modulator substrate 22 may also contain optical-waveguide bends 24 in the optical waveguides 23-1 through 23-n, as illustrated in FIGS. 2c and 2d, that make the transition from the wide waveguide-to-waveguide spacing that matches the optical fibers to the narrower waveguide-to-waveguide spacing permitted by the constraint to maintain optical isolation between the multiple modulators.

FIGS. 2e and 2f illustrate another way to accommodate the large spacing between adjacent optical fibers that couple to the multiple modulators on the modulator substrate 22. In this case, the modulators have the same waveguide-to-waveguide spacing required by the size of the optical fibers. However, the reduced height TEM waveguides 25-1 through 25-n have curved or angled paths so that the center-to-center spacing between adjacent reduced height waveguides 25-1 through 25-n at the multi-furcation point of input waveguide $25_{in}$ is small, constrained by the value for $d_1'$, but the spacing between those adjacent reduced height waveguides 25-1 through 25-n is larger at their junction with the modulator substrate 25, constrained by the allowable spacing between optical fibers 51, 52. In FIG. 2e, the TEM waveguides 25-1 through 25-n are depicted as touching a neighboring one or two of the TEM waveguides 25-1 through 25-n at their upper ends, but these TEM waveguides 25-1 through 25-n do not necessarily need to be in physical contact. They may be spaced apart slightly, for example at their upper ends, if desired.

Figure 3:
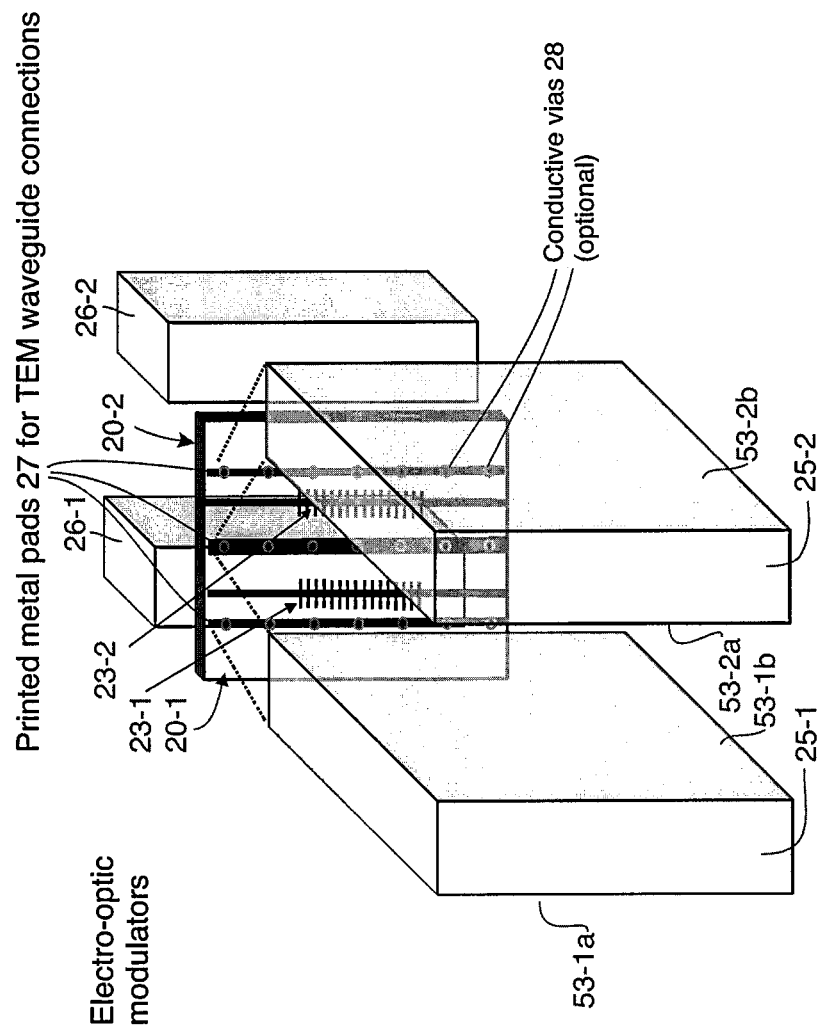
FIG. 3 provides an exploded view of two reduced height waveguides of the multi-furcation and the two modulators that are electrically coupled to those reduced height waveguides.

FIG. 3 shows an exploded view of two adjacent reduced height waveguides 25-1 and 25-2 in the multi-furcation of input waveguide $25_{in}$, and their locations relative to the two optical waveguides 23-1 and 23-2 of optical modulators 20-1 and 20-2. The thin dielectric slabs that make up each TEM reduced height waveguide 25-1 and 25-2 could have metal coatings 53-1a, 53-1b, 53-2a, 53-2b deposited on the top and bottom faces of each slab. Adjacent slabs 25-1 and 25-2 could be electrically and physically attached together at those metal sides 53-1b and 53-2a that face each other, by having those metal sides 53-1b and 53-2a soldered together or bonded together with an electrically conductive epoxy. The optical modulator substrate 22 could have printed metal pads 27 that lie on either side of the optical waveguides 23-1 and 23-2. These metal pads preferably are aligned with the metal coatings of the reduced height waveguides. These pads 27, in turn, could be attached to the metal coatings 53 of the reduced height waveguide by means such as solder or conductive epoxy. The printed metal pads act as electrical extensions of the metal coatings 53. Alternatively, the optical modulator substrate 22, which generally is made of a dielectric or semiconducting material could have no printed metal pads but, instead, could be bonded directly to the reduced height waveguides 25-1 and 25-2, with those reduced height waveguides aligned such that one metal coating 53 lies toward each side of an optical waveguide 23-1 and 23-2. Finally, another set of reduced height RF waveguides 26-1 and 26-2 could, optionally, be attached to the back of the modulator substrate 22 to carry the RF power to an electrical-circuit load. If the modulator substrate 22 is connected to a second set of reduced height waveguides 26-1 and 26-2, that modulator substrate also preferably has sets of metal filled or metal covered via holes 28 formed through it. Those via holes 28 preferably are aligned to the metal coatings 53 of both the first and second set of reduced height waveguides 25-1, 25-2, 26-1 and 26-2. In this way, an electrical path is formed to conduct electrical current directly through the modulator substrate 22 from the first set of reduced height waveguides 25-1 and 25-2 to the second set of reduced height waveguides 26-1 and 26-2.

Figure 4:
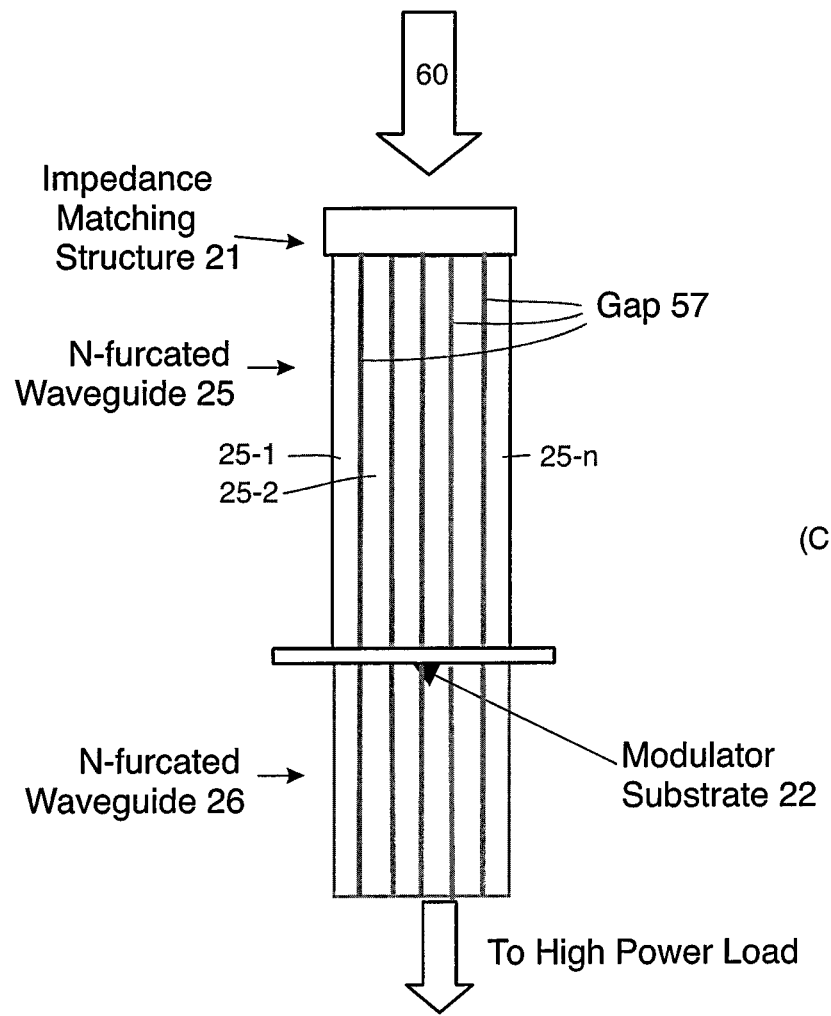
FIG. 4 depicts a front-end assembly having either a physically separated antenna such as a dish antenna or having no other antenna and the RF signal couples directly to the multi-furcation through the impedance matching structure.
Figure 5:
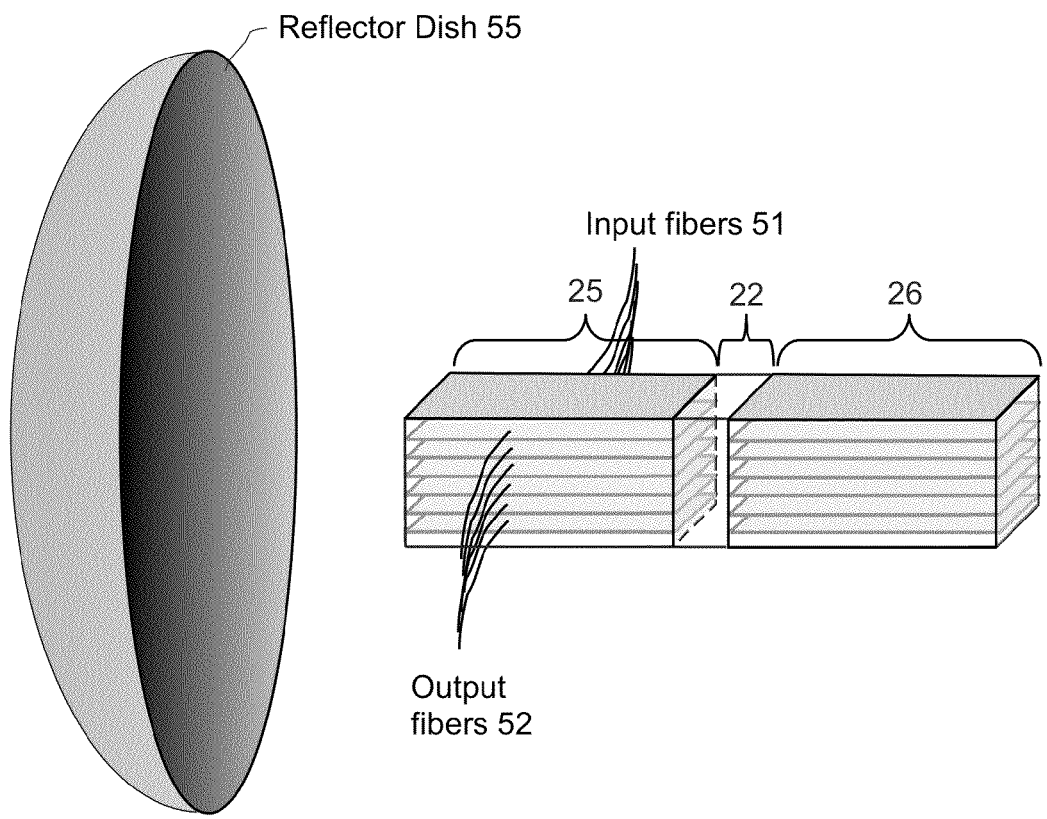
FIG. 5 depicts a front-end assembly having a physically separated antenna such as a dish antenna that focuses and couples the RF signal into a multi-furcated RF waveguide, such as a set of multiple parallel TEM waveguides, that are electrically coupled to multiple optoelectronic modulators on a modulator substrate.

FIG. 4 shows a different embodiment for which the entire aperture at the front of the assembly for coupling in the incident EM radiation 60 is filled with reduced height RF waveguides 25-1 . . . 25-n. In this embodiment, an antenna element, such as the horn antenna shown in the preceding embodiments of FIG. 2, is not utilized for concentrating the incident EM field 60. Instead, the incident radiation 60 is coupled directly into the furcated RF waveguide 25. The incident radiation 60, however, could be concentrated by means of a physically separate antenna such as the dish antenna 55 shown in FIG. 5. In the embodiment of FIG. 4, the multi-furcation can be considered to be part of an open ended RF waveguide 25 that has an aperture size equal to the aperture size of the horn antenna for the embodiment of FIG. 2 (for example λ/2 for a scanning phased array) divided by the value of the dielectric constant of the dielectric material filling the reduced height waveguides. In FIG. 4, the input RF signal 60 couples directly into the multi-furcation $25_{in}$ through the impedance matching structure 21. This impedance matching structure 21 optimizes the coupling (minimizes the reflection) of the incident radiation 60 into the reduced height waveguides 25-1 through 25-n. FIG. 4 also illustrates that the reduced height waveguides 25-1 through 25-n need not be TEM waveguides, which have metal coatings or parallel metal plates covering the dielectric fill material, but those reduced height waveguides 25-1 through 25-n also could be dielectric waveguides, with no metal coatings, that are separated by gaps 27 having a lower value of their dielectric constant or relative permittivity compared to the dielectric material of reduced height waveguides 25-1 through 25-n.

Figure 6:
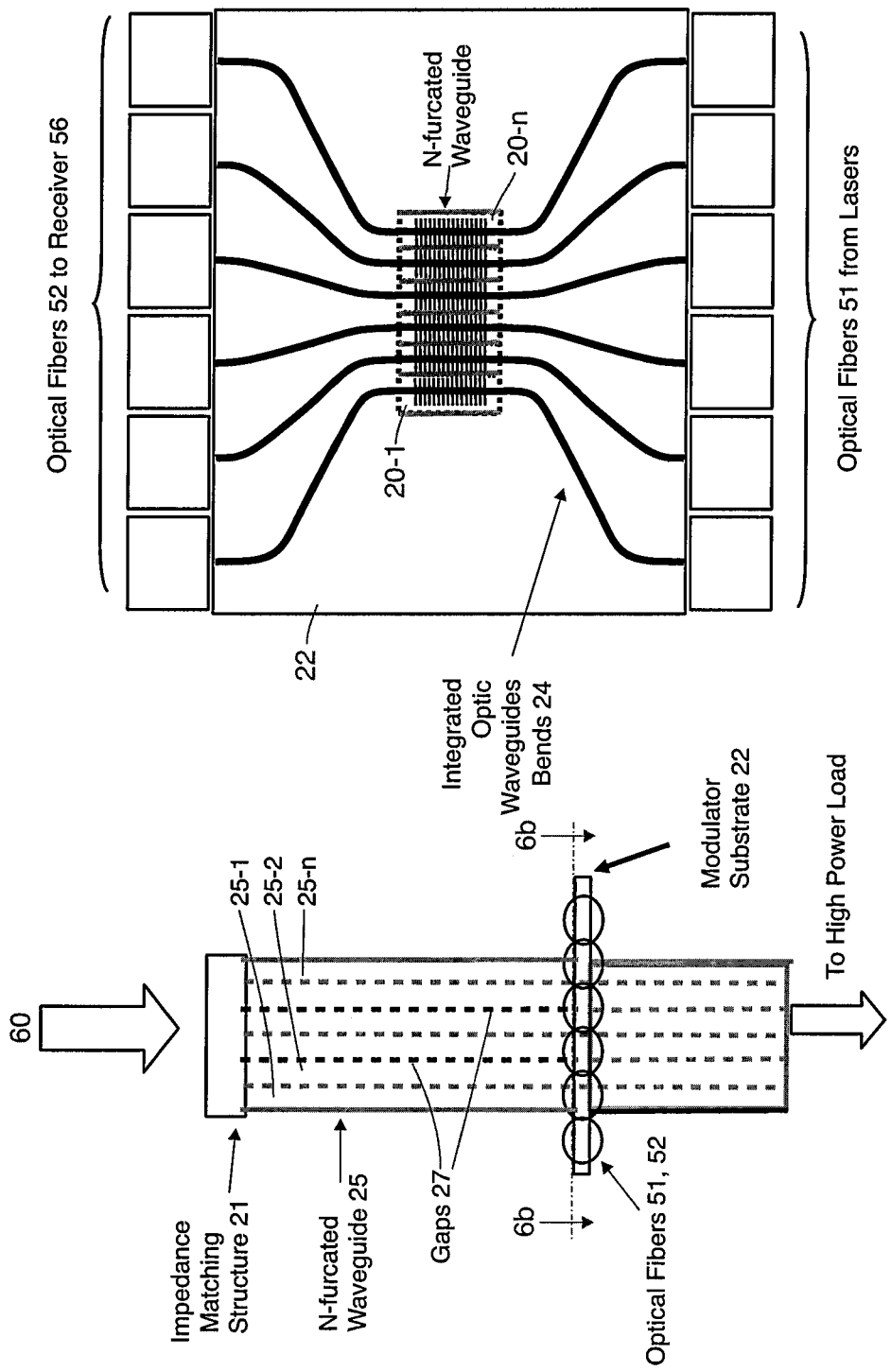
FIGS. 6a and 6b are respectively side-elevation and top views of another embodiment of the invention having multiple optically parallel-connected modulators, wherein each modulator is electrically coupled to a separate reduced height RF waveguide of the multi-furcation. The multiple modulators are optically connected to a set of integrated optic waveguides at each of the two ends of the modulators.

FIGS. 6a and 6b illustrate an embodiment of a dielectric waveguide structure 25 that comprises a multi-furcation of multiple closely spaced reduced-height dielectric waveguides 25-1 through 25-n. These multiple reduced-height dielectric waveguides can be separated by gaps 27 that have a lower value for their dielectric constant than the value of the dielectric constant of the material of those dielectric waveguides 25-1 through 25-n. A separate optoelectronic modulator 20-1 . . . 20-n of the multiple modulators on modulator substrate 22 is aligned to each of the reduced-height dielectric waveguides 25-1 . . . 25-n and senses the electric field propagating in that reduced height dielectric waveguide.

In order to accommodate the large center-to-center spacing between an array of optical fibers 51, 52 that connect to the multiple modulators, the modulator substrate 22 may also contain optical waveguide bends 24 that make the transition from the wide waveguide-to-waveguide spacing matching the optical fibers 51, 52 to the narrower waveguide-to-waveguide spacing permitted by the constraint on the spacing between adjacent reduced height dielectric waveguides (e.g., 25-1 and 25-2).

Alternatively, the dielectric waveguide structure 25 could be a single dielectric waveguide without any furcations or branches. That single dielectric waveguide 25 could be coupled to the modulator substrate 22 that contains multiple optoelectronic modulators 20-1 through 20-n. In this case, the minimum spacing between adjacent modulators (e.g., 20-1 and 20-2) on that modulator substrate 22 would be constrained by the need to maintain optical isolation between those adjacent modulators. The optical waveguide bends 24 would make the transition from the wide waveguide-to-waveguide spacing matching the optical fibers 51, 52 to the narrower waveguide-to-waveguide spacing permitted for adjacent modulators.

Figure 7:
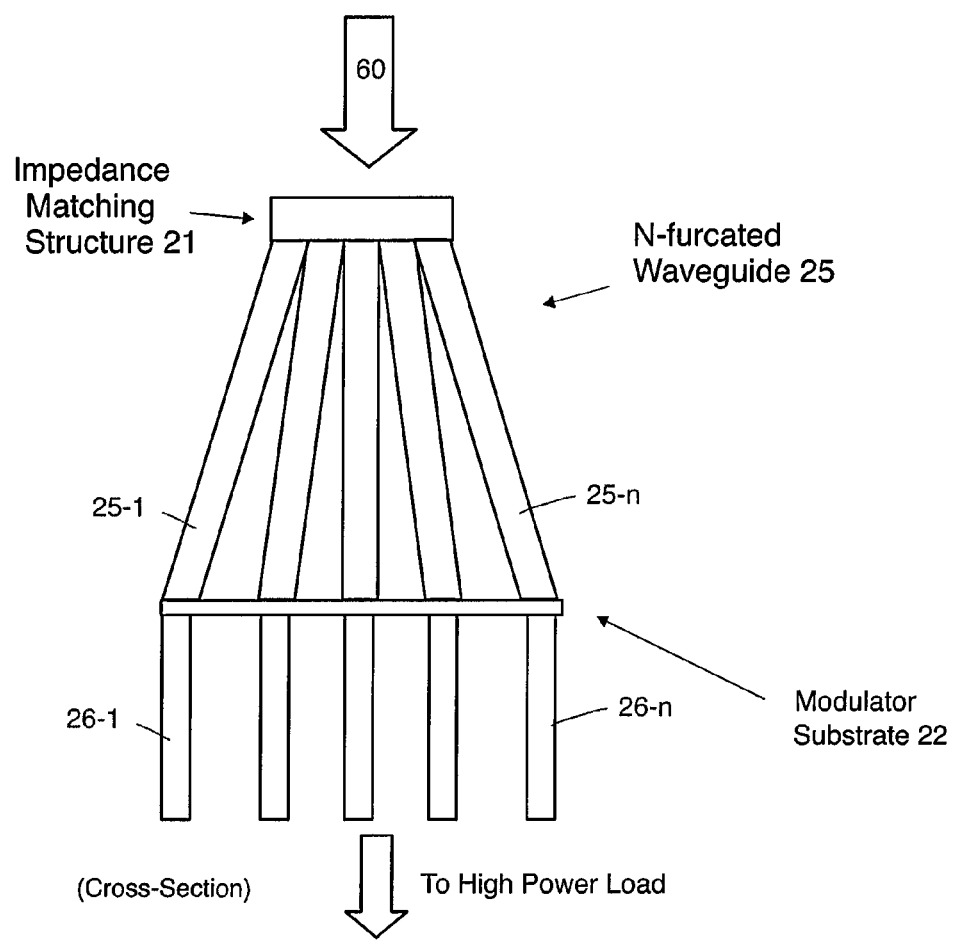
FIG. 7 shows a side view of another front-end assembly that has either a physically separated antenna such as a dish antenna or no other antenna, with the RF signal coupling directly to the multi-furcation through the impedance matching structure. The spacing between the multiple reduced height waveguides of the multi-furcation increases gradually from the point of the multi-furcation to their intersection with the modulator substrate containing the multiple modulators.

FIG. 7 illustrates a variation of the embodiment of FIG. 4 for which the reduced height dielectric waveguides 25-1 through 25-n of the multi-furcated RF waveguide 25 have angled or curved paths. These dielectric waveguides 25-1 through 25-n are joined together at their end closest to the entrance of the multi-furcated structure, i.e., their end closest to the impedance matching structure 21. The spacing between these dielectric waveguides 25-1 through 25-n is gradually increased so that the spacing when these dielectric waveguides are coupled to the modulator substrate 22 is the same as the spacing of the multiple optoelectronic modulators 20-1 through 20-n on that modulator substrate 22. The reasons for having this increase in spacing are discussed above in relation to the embodiment of FIGS. 2e and 2f. When the reduced height waveguides 25-1 through 25-n are widely spaced the electric field presented to the multiple optoelectronic modulators 20-1 through 20-n may be reduced compared to the embodiments of FIGS. 2e and 2f where the reduced height waveguides are implemented by TEM waveguides. An optional second set of reduced height dielectric waveguides 26-1 through 26-n couples the EM field, which was supplied by means of dielectric waveguides 25-1 through 25-n, away from the modulator substrate 22 to a high power load. Also in FIG. 7, the waveguides 25-1 through 25-n are depicted as touching a neighboring one or two of the waveguides 25-1 through 25-n at their upper ends, but these waveguides 25-1 through 25-n do not necessarily need to be in physical contact. They may be spaced apart slightly, for example at their upper ends, if desired.

Figure 8:
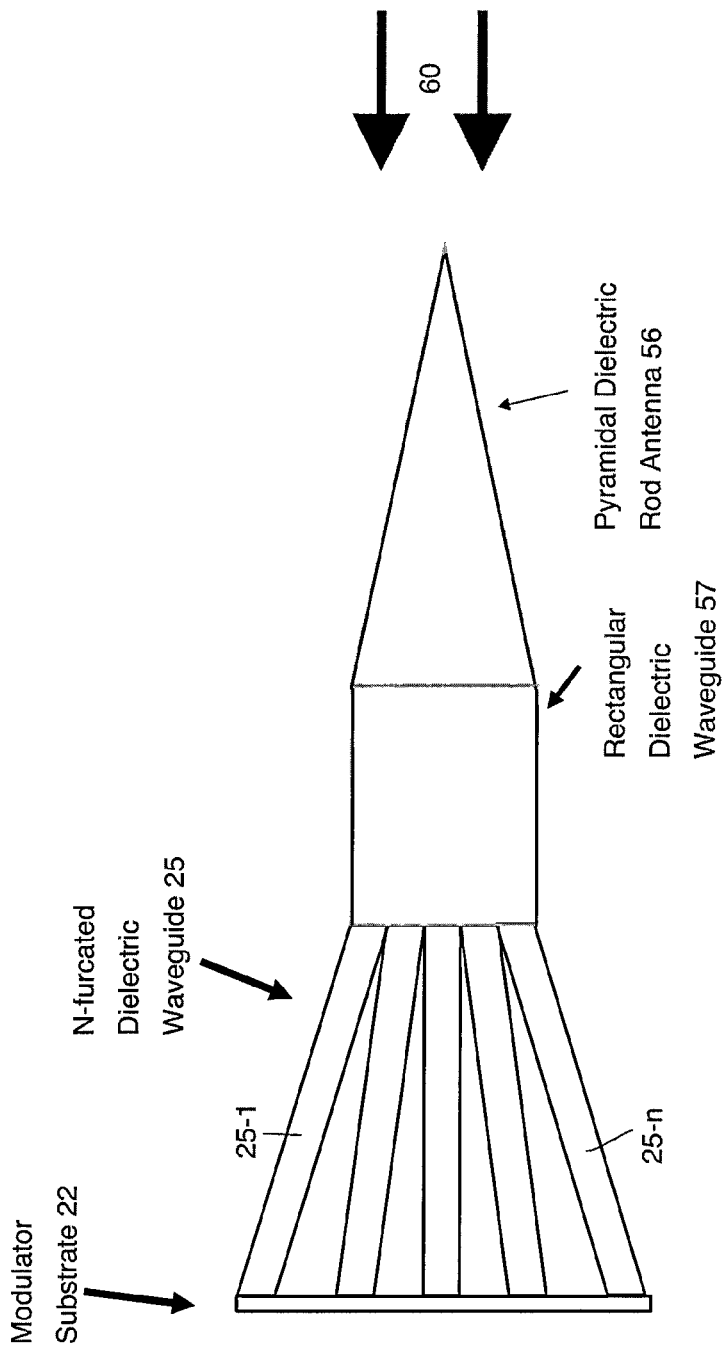
FIG. 8 depicts an embodiment of the invention comprising an array of optoelectronic modulators on a modulator array substrate, wherein the multiple modulators of that array are each electrically coupled to a different dielectric waveguide portion of a multi-furcated dielectric waveguide. The multi-furcated dielectric waveguide is further electrically and physically coupled to a pyramidal dielectric rod antenna.

FIG. 8 illustrates another antenna that can couple incident RF radiation 60 to a dielectric waveguide multi-furcation 25. This antenna is a dielectric rod antenna. The dielectric rod antenna 56 preferably has a pyramidal shape, with each side of the pyramid having a small width at its input end and with each side tapering to a much wider base at its junction with the dielectric waveguide 57. The rectangular-shaped dielectric waveguide 57 then splits or branches into an N-furcated dielectric waveguide 25, with each of the N-furcated dielectric waveguides 25-1 . . . 25-n having a reduced height compared with the dielectric waveguide 57 at the junction with the pyramidal rod antenna 56. Each reduced height dielectric waveguide 25-1 . . . 25-n is then electrically coupled to a modulator 20-1 . . . 20-n located on the modulator substrate 22. In this figure, the front end structure is shown as not having a second set of multi-furcated dielectric waveguide 26-1 through 26-n. In this case, the EM field propagating in the multi-furcated dielectric waveguide 25 is reflected from bottom face of the modulator substrate 22. This reflected EM field propagates again, in the reverse direction, through the entire structure and can exit through the antenna 56. Although this figure shows the reduced height waveguides 25-1 through 25-n as being separated by gaps whose heights increase as those reduced height waveguides approach the modulator substrate 22, the heights of the gaps could remain constant (as illustrated by FIGS. 4a and 6a) or the gaps could have zero height.

Figure 10:
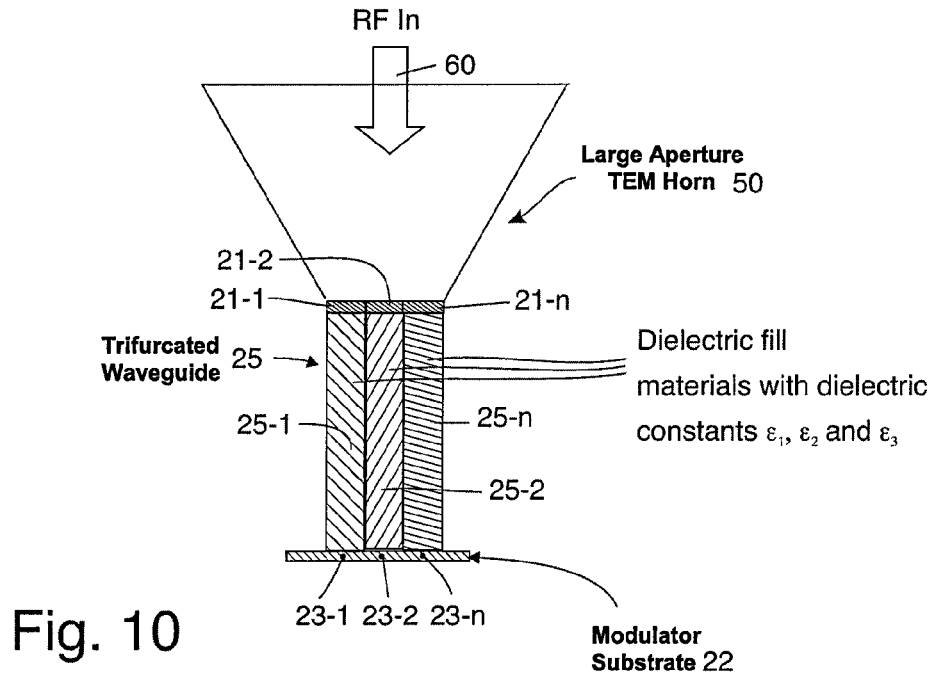
FIG. 10 depicts another embodiment of the invention wherein the RF time delay progression is caused by using different dielectric materials, with differing values of their relative permittivity, in different ones of the multiple reduced height waveguides of the multi-furcation.
Figure 11:
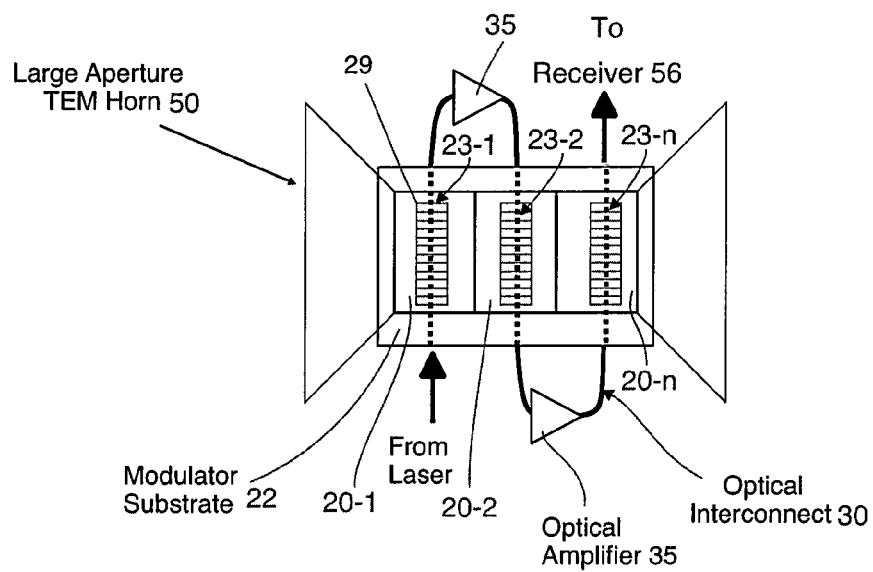
FIG. 11 is a top view of a single modulator substrate containing a series-connected array of modulators electrically coupled to a multi-furcated (trifurcated in the figure) TEM waveguide, such as shown in FIG. 9, but wherein one or more of the optical waveguides interconnecting the series-connected modulators includes an optical amplifier to provide a more uniform level of the optical carrier signal supplied at the entrance of each modulator of the series-connected array of modulators.
Figure 12:
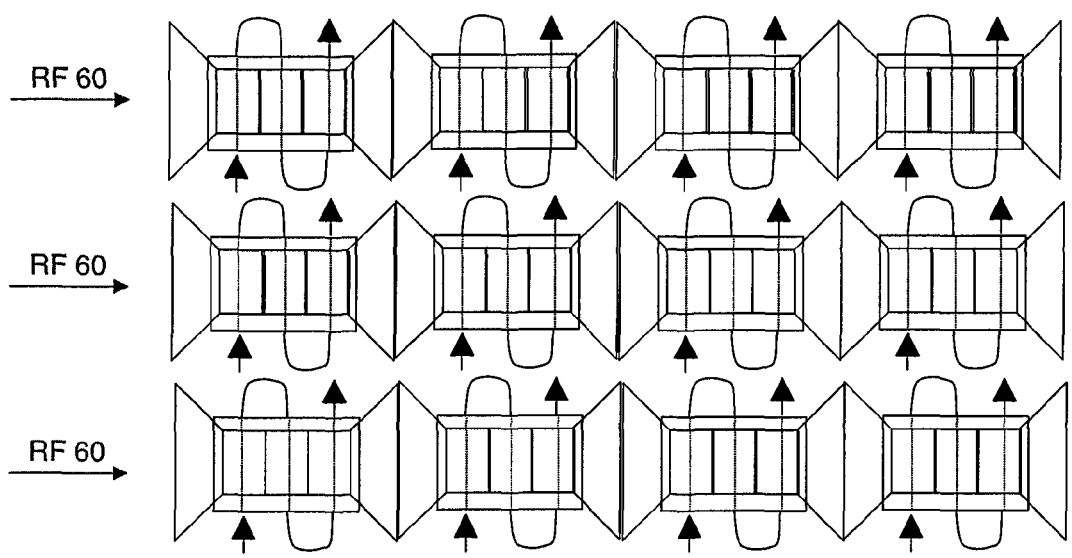
FIG. 12 depicts an array of horn antennas wherein each horn is connected to a separate multi-furcated RF waveguide and optical modulator substrate. The optical signals entering multiple optical modulator substrate could be supplied from a single laser that is multiplexed into each element or could be supplied from multiple lasers. The output modulated optical signals are collected by the radio (not shown) for processing into various antenna-beam pointing directions.

FIGS. 9a and 9b depict another embodiment of the present invention which, as will be seen, has the reduced height RF waveguides coupled to multiple optoelectronic modulators, or modulator sections, that are optically connected in series, or that are optically cascaded. FIGS. 10 through 12 show various modifications and adaptations of this serially connected modulator scheme. For these embodiments, the light to be modulated first passes through a first modulator and then through a second modulator and then through a third modulator, and so on. The modulation depth becomes increasingly greater as that light passes each successive modulator of the cascade.

In a first example of these embodiments, a large aperture TEM waveguide horn antenna 50 is shown (see FIGS. 9a and 9b). This horn antenna 50 could have a minimum aperture dimension of one-half of a free space wavelength of the intended received signal 60, and can be much larger. The horn antenna 50 may or may not be filled or loaded with a dielectric material. The horn antenna tapers down into a TEM waveguiding structure 25. At the point where the taper reaches a minimum, it is connected to the TEM waveguiding structure 25. At this point, the TEM waveguiding structure is multi-furcated (that is it has multiple branches) into multiple reduced height TEM waveguides 25-1, 25-2 and 25-3. In this illustration, the input RF waveguide 25 is trifurcated into three reduced height waveguides 25-1, 25-2 and 25-3, but it could be bifurcated or multi-furcated (with n waveguides). This multi-furcation is created by using metal plates 53, 53i that extend the width of the TEM waveguide. The outermost metal plates 53 of the multi-furcated waveguide are joined with (or integral with) the metal leaves 54 of the horn antenna 50. A portion 37-1, 37-2, and 37-3 of each reduced height waveguide of the multi-furcation is dielectrically loaded with a material that has a specific value for its dielectric constant $\in$. These values could be the same or they could be different. Furthermore, the distance between the metallic plates 53, 53i bounding a dielectric-loading layer 37-1, 37-2, 37-3 of a reduced height waveguides 25-1, 25-2, 25-3 need not be the same as the distance between the metallic plates bounding the dielectric loading layer of a different reduced height waveguide. That is, the various reduced height waveguides 25-1, 25-2, 25-3 need not all have the same height. The use of a TEM waveguide 25 that is multi-furcated into multiple dielectric filled reduced height TEM waveguides 25-1, 25-2, 25-3 has the advantage of being able to maintain a uniform electric field strength over most of the width of each reduced height TEM waveguide 25-1, 25-2 and 25-3 of the multi-furcation. In order to transition efficiently from free space to the dielectrically loaded reduced height waveguides 25-1, 25-2, 25-3, impedance matching structures 21-1, 21-2, 21-3 are included as shown in FIGS. 9a and 9b adjacent each waveguide 25-1 . . . 25-3. These impedance matching structures 21-1 . . . 21-3 could include one or more layers of dielectric materials that have specific and differing values for their dielectric constant, in a manner known in the art (see document 8 noted above).

The input reduced height waveguides 25-1 through 25-3 are connected to the modulator substrate 22 and each waveguide 25-1 . . . 25-3 is electrically coupled to a separate modulator, or modulator section, 20-1 . . . 20-$n$ in modulator substrate 22. Beyond the modulator substrate 22 is an, optional, output multi-furcated waveguide $26_{out}$ which can be terminated in a high power load (not shown). In general, a wide range of optoelectronic modulator types can be used, both electro-optic (see document 6 identified above) and electro-absorptive (see document 7 identified above), as long as the top and bottom metal sides 53, 53$i$ of each reduced height waveguide 25-1 . . . 25-3 acts as an electrode for the associated modulator element 20-1 . . . 20-3. Between each optical modulator, or modulator section, 20-1 . . . 20-$n$ there is an optical interconnection 30 connecting the optical modulator sections 20-1 through 20-3 in series. These interconnections 30 can be pieces of optical fiber (as depicted), or they could be integrated optic waveguides that also are contained in the same substrate 22 as the optical modulators 20-1 . . . 20-3 (as described in related U.S. patent application Ser. No. 12/141,825 mentioned above). In this way the modulators, or modulator elements, 20-1 through 20-3 are optically connected in series such that the optical signal travels sequentially from one modulator to the next (e.g., from modulator 20-1 to modulator 20-2).

In the embodiment shown in FIGS. 9$a$ and 9$b$, the RF signal power is split into each of the reduced height waveguides 25-1 . . . 25-3 and proceeds toward the modulator substrate 22. Note, however, that the electric field strength at the junction between the TEM horn 50 and the multi-furcated waveguide 25 (i.e., before the split) is the same as the electric field strength in a reduced height waveguide 25-1 . . . 25-3 (i.e., after the split). Part of each reduced height waveguide 25-1 . . . 25-3 is filled with a dielectric loading material 27-1 . . . 27-3 and part of each reduced height waveguide 25-1 . . . 25-3 is kept not filled. By varying the length of the dielectric loading layer 37-1 through 37-3 filling those reduced height waveguides 25-1 through 25-3 and/or by varying the dielectric constant of that loading material, the time it takes for the RF signal to reach the modulator substrate 22 can be adjusted for each reduced height waveguide.

To further describe this constraint, assume that the time it takes the RF signal to reach the modulator substrate 22 progresses by a given delay time $\Delta T$ from one reduced height waveguide to the next. In order to maintain a phase match between the RF signal arriving at each modulator and the modulation of the light reaching each modulator in sequence, the delay time $\Delta T$ preferably should meet the following constraint:

$$\Delta T = \frac{(L_{modulator} n_{modulator} + L_{interconnect} n_{interconnect})}{c}$$

where $L_{modulator}$ is the length of a modulator or modulator section 20-1 . . . 20-3, $L_{interconnect}$ is the length of the optical interconnect 30 (such as optical fiber) between adjacent modulator sections (e.g., 20-1 and 20-2), $n_{modulator}$ is the effective index of refraction of the light propagating in the integrated optic waveguide (e.g., 23-1) of the modulator (e.g., 20-1), $n_{interconnect}$ is the effective index of refraction of the light propagating in the optical waveguide or fiber 30 that interconnects two modulators, and c is the speed of light in vacuum. The effective indices of refraction are defined to be $c/v_{group}$ where $v_{group}$ is the group velocity of the light propagating through the optical waveguide or the modulator. The length of the modulator preferably is limited so that the time for the optical signal to propagate completely through the modulator is no more than one-half a period of the RF signal. For example, for an RF signal frequency of 10 GHz, the optical signal preferably should propagate through the modulator in at most 0.05 nsec. Assuming a lithium niobate modulator with an effective index of refraction, $n_{modulator}$=2.2 (that is, close to the index of refraction for bulk lithium niobate), the length of the modulator should be at most $$L_{modulator} = \frac{\Delta t_{modulator} \bullet c}{n_{modulator}} = \frac{(0.05 \text{ nsec})(2.998 \times 10^{10} \text{ cm/sec})}{2.2} = 0.68 \text{ cm}$$

Assume that the optical waveguide interconnections 30 between successive series-connected modulators also are fabricated in the lithium niobate substrate and that the length of an interconnection waveguide 30 between adjacent modulators (e.g., 20-1 and 20-2) is 0.5 cm. Then the time required for the light to propagate through each interconnection is $$\Delta t_{interconnect} = \frac{L_{interconnect} \bullet n_{interconnect}}{c} = \frac{(0.5 \text{ cm})(2.2)}{2.998 \times 10^{10} \text{ cm/sec}} = 0.037 \text{ nsec.}$$

If the dielectric material loading the TEM reduced height waveguides 25-1 . . . 25-3 has a dielectric constant of 30, the desired difference between the lengths of the dielectric-filled portions 37-1 . . . 37-3 of adjacent TEM reduced height waveguides is $$\Delta L_{waveguide} = (\Delta t_{modulator} + \Delta t_{interconnect}) \cdot \left(\frac{c}{\sqrt{\varepsilon_{RF}}}\right)$$
$$= (0.05 \text{ nsec} + 0.037 \text{ nsec}) \cdot \left(\frac{2.998 \times 10^{10} \text{ cm/sec}}{\sqrt{30}}\right)$$
$$= 0.48 \text{ cm}$$

An alternative embodiment is shown in FIG. 10. In this embodiment, the delay time $\Delta T$ between the RF signals coupled from one reduced height waveguide (e.g., 25-1) to its associated optoelectronic modulator (e.g., 20-1) and from an adjacent reduced height waveguide (e.g., 25-2) to its optoelectronic modulator (e.g., 20-2) is achieved by filling those two reduced height waveguides (e.g., 25-1 and 25-2) with fillers (e.g., 37-1 and 37-2) comprising materials having different values for their dielectric constant ($\in_1$ and $\in_2$). The differing values for the dielectric constant can be achieved by altering the composition of the materials that make up the dielectric filler using ways known in the art (see document 5 mentioned above). In this case, the lengths of the dielectric loaded sections (e.g., 37-1 and 37-2) can be made equal, which may have an advantage with regard to ease of fabrication of the front-end assembly. This embodiment is shown as not having the optional reduced height waveguides 26-1 . . . 26-3 which would be located at the back side of the modulator substrate 22. There preferably are impedance matching structures 21-1 . . . 21-$n$ located between the dielectric fill portions 37-1 . . . 37-3 of each reduced height waveguide 25-1 . . . 25-3 and the horn antenna 50, since the materials properties of these dielectric fillers could be different for each reduced height waveguide in the multi-furcation 25.

Another embodiment is shown in FIG. 11. In that figure, optical amplifiers 35 are located in at least some of the optical interconnections 30 between the adjacent series-connected modulators (e.g., 20-1 and 20-2) of modulator substrate 22. An example of a possible optical amplifier can be found in Morito, et. al. (see document 9 mentioned above), although other types of optical amplifiers could be used. At each pass through a modulator, or modulator section, some of the power in the optical carrier may be lost (generally by scattering or absorption) or be reflected. Thus the depth of modulation that can be contributed by the subsequent modulators or modulator sections of the cascade is reduced. This embodiment would enable the optical carrier (as well as the modulation sidebands) to be amplified before the partially modulated light enters the next modulator or modulator section. Thus each modulator or modulator section of that series connection of modulators or modulator sections could contribute to the total depth of modulation in an approximately uniform manner, thereby further increasing the depth of modulation.

FIG. 12 shows a top view of an array of TEM horn antennas wherein each horn antenna is connected to a multi-furcated waveguide of the type shown in FIGS. 9a, 9b, 10 and 11. The multiple RF waveguides of the multi-furcation are coupled to multiple optoelectronic modulators, with those multiple optoelectronic modulators being optically connected in series. The optical signals coming out of the many unit elements comprising horn and multi-furcated waveguide and modulator substrate can be processed together for beam scanning at a processing unit (not shown in the figure). Different portions of the incident RF electromagnetic signal 60 are coupled into different TEM horn antennas of the array.

Figure 13:
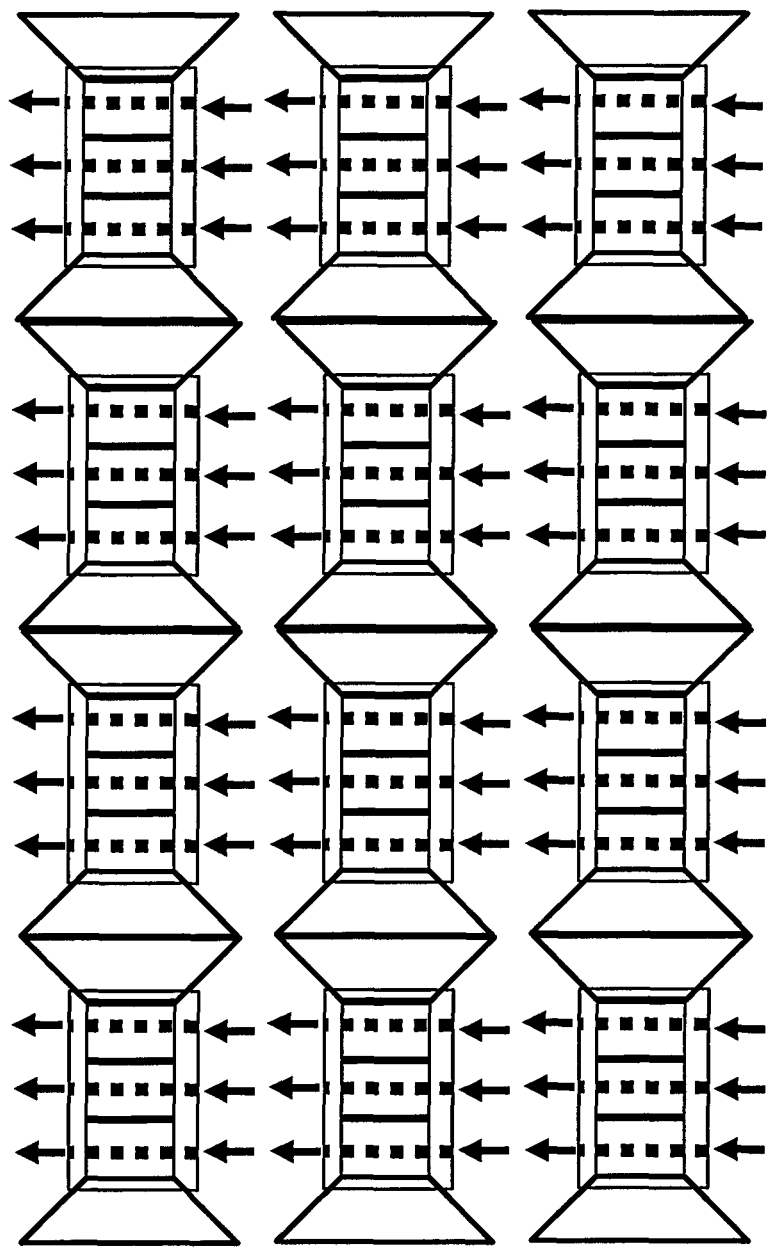
FIG. 13 depicts an array of RF front-end assemblies having multi-furcated waveguides electrically coupled to multiple modulators on a modulator substrate, wherein parallel optical signals are modulated by parallel optical modulators for each element of the array.

FIG. 13 shows a top view of an array of TEM horn antennas wherein each horn antenna is connected to a multi-furcated waveguide of the types shown in FIGS. 2a-2f. The multiple RF waveguides of the multi-furcation are coupled to multiple optoelectronic modulators, with those multiple optoelectronic modulators being optically connected in parallel and supplying modulated light to one or more photodetectors. The electrical signals coming out of these many unit elements comprising horn and multi-furcated waveguide and modulator substrate and photodetectors can be processed together for beam scanning at a processing unit (not shown in the figure).

Although TEM horn antennas are shown in FIGS. 12 and 13, other types of antennas also could be coupled to the multi-furcated waveguides. For example, dielectric rod antennas such as shown in FIG. 8 could be used for the multiple antenna elements of an array. Also, the multi-furcated waveguides of the various elements of the array need not be TEM waveguides. For example, they also could be dielectric waveguides such as those shown in FIGS. 4, 6a, 6b and 7. Those dielectric waveguides could be coupled to antenna elements such as the dielectric rod antenna shown in FIG. 8.

Figure 14:
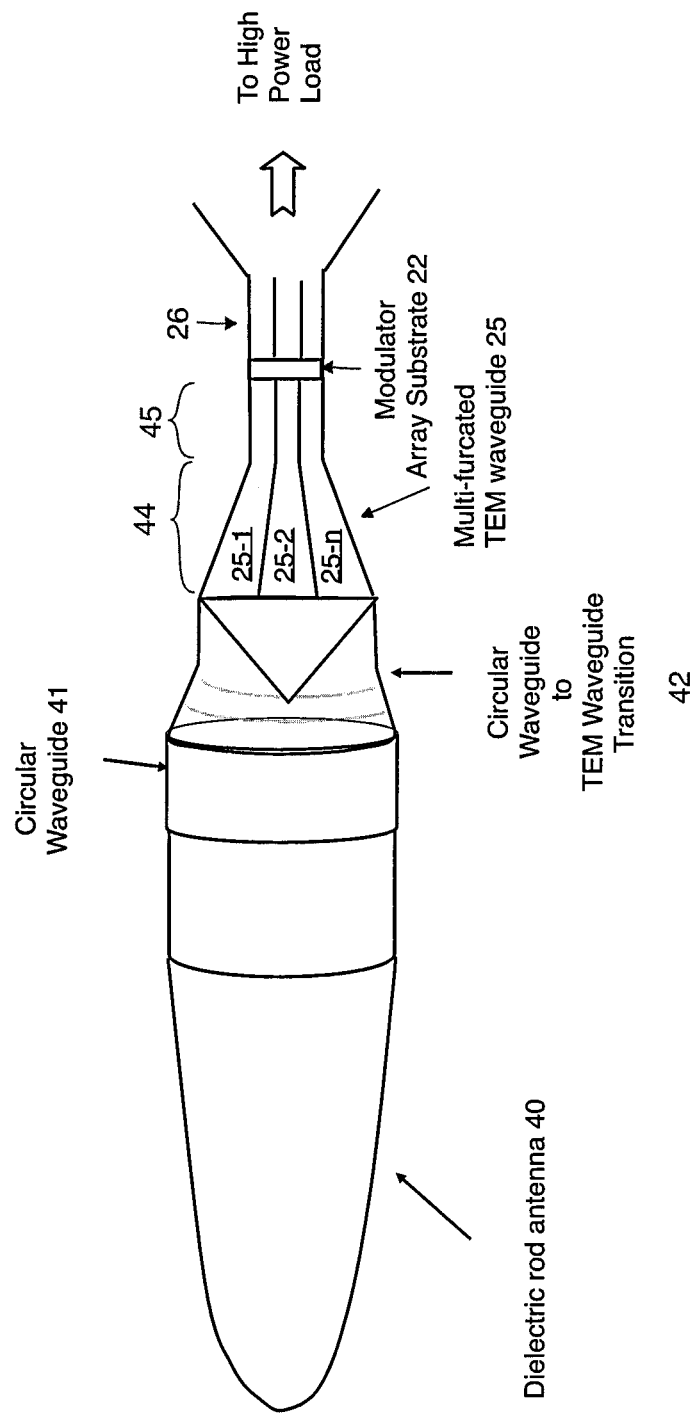
FIG. 14 depicts an embodiment of the invention comprising an array of optoelectronic modulators that are electrically coupled to a multi-furcated (trifurcated in the figure) TEM waveguide containing multiple reduced height TEM waveguides. The multi-furcated TEM waveguide is further electrically and physically coupled to a dielectric rod antenna.

FIG. 14 illustrates another embodiment for which a multi-furcated TEM waveguide is coupled to a modulator substrate 22 containing multiple modulators. These multiple optoelectronic modulators (not shown) can be optically connected in parallel or in series, as described above. As noted above, the multi-furcated TEM waveguide can be coupled to other kinds of antenna besides the TEM horn. FIG. 14 shows the multi-furcated TEM waveguide 25 being coupled to a dielectric rod antenna 40. This assembly also could include known RF transition elements such as a metal enclosed circular waveguide 41 and a circular waveguide to TEM waveguide transition 42 to improve the efficiency of the coupling of EM energy from the dielectric rod 40 to the TEM waveguide 25. The multiple reduced height TEM waveguides 25-1 through 25-n of the multi-furcated TEM waveguide illustrated in the figure have a tapered portion 44 and a non-tapered portion 45. The height of a reduced height waveguide, i.e., the separation between the top and bottom metal coatings of that reduced height waveguide, in a tapered portion changes from a larger value to a smaller value. This tapering further concentrates the electric field presented to the optoelectronic modulator through the reduced height waveguide. Note that all of the embodiments described above could include tapered portions of their reduced height waveguides.

It should be understood that the above-described embodiments are merely some possible examples of implementations of the presently disclosed technology, set forth for a clearer understanding of the principles of this disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. A multi-furcated structure responsive to input radio-frequency electromagnetic radiation comprising:

a plurality of radio frequency waveguide sections, at least one end of each radio frequency waveguide section being physically in contact with or adjacent one end of at least one other radio frequency waveguide section of said plurality of radio frequency waveguide sections, wherein each radio frequency waveguide section couples a different spatial portion of the input electromagnetic radiation, the plurality of radio frequency waveguide sections being fed from a common source of said radio frequency electromagnetic radiation;

each radio frequency waveguide section having an optoelectronic modulator electrically and physically coupled to it, wherein each optoelectronic modulator responds to the electromagnetic radiation coupled to it by the radio frequency waveguide section to which that optoelectronic modulator is electrically coupled and physically connected;

each optoelectronic modulator having an optical waveguide disposed therein such that, in use, light traveling in the optical waveguides of said optoelectronic modulators travels in a direction orthogonal with respect to the radio frequency energy propagating in said radio frequency waveguide sections; and wherein each optoelectronic modulator has the optical waveguide disposed therein such that, in use, light traveling in the optical waveguides of said optoelectronic modulators (i) travels in a direction orthogonal with respect to the radio frequency energy propagating in said radio frequency waveguide sections and (ii) is responsive to the orthogonally traveling radio frequency energy.

2. The multi-furcated structure of claim 1 wherein each radio frequency waveguide section has dielectric material having a length and/or a dielectric constant selected time delay so that a relative delay of the radio frequency electromagnetic radiation propagating in the radio frequency waveguide sections accommodates for a time delay of the light traveling between the optoelectronic modulators.

3. The multi-furcated structure of claim 2 wherein the plurality of radio frequency waveguide sections all are filled with dielectric filler material having the same value for the dielectric constant.

4. The multi-furcated structure of claim 3 wherein a first radio frequency waveguide section of the plurality of radio frequency waveguide sections contains a dielectric material having a first length and a second radio frequency waveguide section of the plurality of radio frequency waveguide sections contains a dielectric material having a second length, wherein said first length and said second length are different.

5. The multi-furcated structure of claim 2 wherein a first radio frequency waveguide section of the plurality of radio frequency waveguide sections contains a dielectric material having a first value for its dielectric constant and a second radio frequency waveguide section of the plurality of radio frequency waveguide sections contains a dielectric material having a second value for its dielectric constant, wherein said first value and said second value are different.

6. The multi-furcated structure of claim 1 further including an impedance matching structure disposed between said common source of said radio frequency energy and said plurality of radio frequency waveguide sections.

7. The multi-furcated structure of claim 1 wherein the plurality of radio frequency waveguide sections are transverse electromagnetic waveguides disposed parallel to each other and have parallel metallic walls for which, when two of said radio frequency waveguide sections are immediately adjacent one another, one of said metallic walls of one of said immediately adjacent radio frequency waveguide sections confronts one of said metallic walls of the other one of said immediately adjacent radio frequency waveguide sections.

8. The multi-furcated structure of claim 1 wherein the plurality of radio frequency waveguide sections are transverse electromagnetic waveguides disposed parallel to each other and have parallel metallic walls for which, when two of said radio frequency waveguide sections are immediately adjacent, one of said metallic walls of one of said immediately adjacent radio frequency waveguide sections is shared as one of said metallic walls of the other one of said immediately adjacent radio frequency waveguide sections.

9. The multi-furcated structure of claim 1 in combination with a horn antenna wherein the horn antenna provides the common source of said radio frequency energy.

10. The multi-furcated structure and horn antenna combination of claim 9 wherein exterior-most metallic surfaces of said plurality of radio frequency waveguide sections are electrically connected to opposing metallic surfaces of said horn antenna.

11. The multi-furcated structure of claim 1 wherein at least a first and a second optoelectronic modulator of said optoelectronic modulators are disposed on a common substrate and wherein said common substrate is physically attached to one of the radio frequency waveguide sections coupled to said first optoelectronic modulator and said common substrate also is physically attached to another of the radio frequency waveguide sections coupled to said second optoelectronic modulator.

12. The multi-furcated structure of claim 11 wherein said common substrate further includes optical waveguide bends for establishing a different separation between (a) portions of optical waveguides disposed in said optoelectronic modulators and (b) portions of optical waveguides located at or near an edge of said common substrate, said portions of optical waveguides located at the edge of said common substrate conducting light between optical fibers and said optoelectronic modulators.

13. The multi-furcated structure of claim 11 wherein said common substrate further includes at least one metal filled via hole or metal coated via hole, said at least one metal filled or metal coated via hole conducting an electrical current from a first radio frequency waveguide section physically connected to one side of said common substrate to a second radio frequency waveguide section physically connected to another, opposing side of said common substrate.

14. The multi-furcated structure of claim 1 wherein the plurality of radio frequency waveguide sections are dielectric waveguides disposed parallel to each other and have a gap between each pair of immediately adjacent dielectric waveguides, wherein the gap is filled with a material whose dielectric constant is smaller than the dielectric constant of dielectric material comprising the plurality of radio frequency waveguide sections.

15. The multi-furcated structure of claim 1 wherein the plurality of radio frequency waveguide sections comprise dielectric material, with no gap occurring between the dielectric material of immediately adjacent radio frequency waveguide sections of the plurality of radio frequency waveguide sections, said plurality of radio frequency waveguide sections acting as a unity radio frequency dielectric waveguide.

16. The multi-furcated structure of claim 1 wherein the plurality of radio frequency waveguide sections are dielectric waveguides, wherein immediately adjacent radio frequency waveguide sections approach or contact each other at least at a first point or points along a length of said radio frequency waveguide sections and wherein the adjacent radio frequency waveguide sections are separated by an increasing gap at second points spaced from said first point or points.

17. The multi-furcated structure of claim 1 wherein a first optoelectronic modulator of said optoelectronic modulators receives light from a laser source and supplies light to a second optoelectronic modulator of said optoelectronic modulators, said first optoelectronic modulator and said second optoelectronic modulator being coupled to different radio frequency waveguide sections of said plurality of radio frequency waveguide sections.

18. The multi-furcated structure of claim 17 wherein said first optoelectronic modulator couples light to an optical amplifier and said optical amplifier couples amplified light to said second optoelectronic modulator.

19. The multi-furcated structure of claim 1 in combination with a dish antenna wherein the dish antenna provides the common source of said radio frequency energy.

20. The multi-furcated structure of claim 1 in combination with a dielectric rod antenna wherein the dielectric rod antenna provides the common source of said radio frequency energy.

21. The multi-furcated structure of claim 1 wherein each radio frequency waveguide section is a dielectric radio frequency waveguide section.

22. A method for sensing incident electromagnetic radiation comprising the steps of:
coupling a first spatial portion of an electromagnetic field of said incident electromagnetic radiation into a first radio frequency waveguide section and coupling a second spatial portion of the electromagnetic field of said incident electromagnetic radiation into a second radio frequency waveguide section;
propagating the electromagnetic field coupled into said first radio frequency waveguide section in a first direction through said first radio frequency waveguide section to a first optoelectronic modulator located on a modulator substrate and propagating the electromagnetic field coupled into said second radio frequency waveguide section in a second direction through said second radio frequency waveguide section to a second optoelectronic modulator located on said modulator substrate;

propagating light through said first optoelectronic modulator in a first orthogonal direction disposed orthogonally to the first direction that said electromagnetic field propagates through said first radio frequency waveguide section and propagating light through said second optoelectronic modulator in a second orthogonal direction disposed orthogonally to the second direction that said electromagnetic field propagates through said second radio frequency waveguide section;

modulating the light propagating through said first optoelectronic modulator according to a time-varying electric field component of said electromagnetic field propagating in said first direction to said first optoelectronic modulator, and modulating the light propagating through said second optoelectronic modulator according to a time-varying electric field component of said electromagnetic field propagating in said second direction to said second optoelectronic modulator; and wherein the step of modulating the light propagating through said first optoelectronic modulator according to said time-varying electric field component of said electromagnetic field propagating in said first direction to said first optoelectronic modulator occurs in said first orthogonal direction, and wherein the step of modulating the light propagating through said second optoelectronic modulator according to the time-varying electric field component of said electromagnetic field propagating in said second direction to said second optoelectronic modulator occurs in said second orthogonal direction.

23. The method of claim 22 further comprising propagating modulated light produced at said first optoelectronic modulator to said second optoelectronic modulator for modulation by said second optoelectronic modulator.

24. The method of claim 22 further comprising applying a time delay to said electromagnetic field propagating through said second radio frequency waveguide section such that said time delay is matched to a time delay of the light propagating through said first optoelectronic modulator plus a time delay of the light propagating from said first optoelectronic modulator to said second optoelectronic modulator.

25. The method of claim 22 further comprising photodetecting the modulated light produced by said first optoelectronic modulator to generate a first radio frequency signal and photodetecting the modulated light produced by said second optoelectronic modulator to generate a second radio frequency signal; and combining said first and second radio frequency signals.

26. The method of claim 22 wherein the first and second directions are non-parallel directions.

27. The method of claim 22 wherein the first and second radio frequency waveguide sections each comprise at least one dielectric waveguide.

28. A multi-furcation structure comprising: a plurality of optoelectronic modulators and a furcated waveguide for distributing incident electromagnetic radiation into a plurality of different waveguide sections forming said furcated waveguide, each different waveguide section coupling a different spatial portion of the incident electromagnetic radiation to a different one of said plurality of optoelectronic modulators and wherein each one of said waveguide sections is disposed in contact with at least another one of said waveguide sections.

29. The multi-furcation structure of claim 28 wherein each optoelectronic modulator has an optical waveguide disposed therein such that, in use, light traveling in the optical waveguides of said optoelectronic modulators travels in a direction orthogonal with respect to the different spatial portion of the incident electromagnetic radiation propagating in each of the waveguide sections.

30. The multi-furcation structure of claim 29 wherein each different waveguide section has first and second portions, the first portions of the different waveguide sections being disposed parallel to each other and the second portions of the different waveguide sections being disposed in a diverging relationship with resect to each other.

31. The multi-furcation structure of claim 30 wherein at least one of said optoelectronic modulators is disposed between the first and second portions of the each of the different waveguide sections.

32. The multi-furcated structure of claim 28 wherein each waveguide section is a dielectric waveguide forming said furcated waveguide and wherein each one of said waveguide sections is disposed in contact with at least another one of said waveguide sections.

33. The multi-furcated structure of claim 28 wherein each one of said waveguide sections is disposed in contact with at least another one of said waveguide sections at first ends thereof and wherein each one of said waveguide sections is disposed spaced a distance away from at least another one of said waveguide sections at second ends thereof.

34. The multi-furcated structure of claim 33 wherein the plurality of optoelectronic modulators is disposed at the second ends of the waveguide sections.

35. The multi-furcated structure of claim 28 wherein the incident electromagnetic radiation is applied to a impedance matching structure which is in immediate contact with said furcated waveguide.

36. The multi-furcated structure of claim 35 wherein each waveguide section comprises a reduced height waveguide.

37. The multi-furcated structure of claim 28 wherein each waveguide section comprises a reduced height waveguide.

38. The multi-furcated structure of claim 28 wherein each waveguide section comprises a reduced height waveguide and wherein the reduced height of each waveguide tapers in height over at least a portion of a length of each waveguide section.

39. A multi-furcated structure responsive to input electromagnetic radiation comprising:
 a plurality of TEM waveguide sections, at least one end of each TEM waveguide section being physically in contact with or adjacent one end of at least one other TEM waveguide section of said plurality of TEM waveguide sections, wherein each TEM waveguide section couples a different spatial portion of the input electromagnetic radiation, the plurality of TEM waveguide sections being fed from a common source of said input electromagnetic radiation;
 each TEM waveguide section having an optoelectronic modulator electrically and physically coupled to it, wherein each optoelectronic modulator responds to the electromagnetic radiation coupled to it by the TEM waveguide section to which that optoelectronic modulator is electrically coupled and physically connected;
 each optoelectronic modulator having an optical waveguide disposed therein such that, in use, light traveling in the optical waveguides of said optoelectronic modulators travels in a direction orthogonal with respect to the electromagnetic radiation propagating in said TEM waveguide sections.

* * * * *